United States Patent
Johnson et al.

(12) 
(10) Patent No.: US 10,303,976 B2
(45) Date of Patent: May 28, 2019

(54) PERFORMANCE ENHANCEMENT FOR TWO-DIMENSIONAL ARRAY PROCESSOR

(71) Applicant: Mireplica Technology, LLC, Austin, TX (US)

(72) Inventors: William M. Johnson, Austin, TX (US); Toshio Nagata, Lake Elsinore, CA (US)

(73) Assignee: Mireplica Technology, LLC, Austin, TX (US)

( * ) Notice: Subject to any disclaimer, the term of this patent is extended or adjusted under 35 U.S.C. 154(b) by 128 days.

(21) Appl. No.: 15/218,071

(22) Filed: Jul. 24, 2016

(65) Prior Publication Data

US 2017/0024632 A1    Jan. 26, 2017

Related U.S. Application Data

(60) Provisional application No. 62/195,921, filed on Jul. 23, 2015.

(51) Int. Cl.
*G06K 9/54* (2006.01)
*G06K 9/62* (2006.01)
(Continued)

(52) U.S. Cl.
CPC ......... *G06K 9/6229* (2013.01); *G06F 3/0604* (2013.01); *G06F 3/0644* (2013.01);
(Continued)

(58) Field of Classification Search
CPC .............. G06T 2210/52; H04N 19/436; G06K 9/00986; G06K 9/00624; G06K 9/00973
See application file for complete search history.

(56) References Cited

U.S. PATENT DOCUMENTS 5,682,208 A * 10/1997 Harney .................. H04N 5/145
                                                            348/416.1
5,995,747 A    11/1999 Guttag et al.
(Continued)

FOREIGN PATENT DOCUMENTS

EP    0293700 B1    2/1995

OTHER PUBLICATIONS

International Search Report & Written Opinion dated Dec. 13, 2013 for PCT/US2013/054340.
(Continued)

*Primary Examiner* — Euengnan Yeh
(74) *Attorney, Agent, or Firm* — Gentry McLean, PLLC

(57) ABSTRACT

Methods and systems are disclosed for increased speed of processing operations on data in two-dimensional arrays, and for detecting a feature in an image. A method for detecting a feature in an image comprises storing, in a set of data memories within a parallel processing system, first image data representing pixels of a first image. The method further comprises storing, in a memory of a host processor coupled to the parallel processing system, feature kernel data representing a set of weight matrices. A method for increased speed of processing operations on data in two-dimensional arrays comprises storing, in a set of data memories within a parallel processing system, first array data representing elements of a first array. The method further comprises, for each of multiple selected elements within the first array, performing a processing operation on the selected element to produce an output element corresponding to the selected element.

22 Claims, 16 Drawing Sheets

(51) Int. Cl.
- *G06F 3/06* (2006.01)
- *G06F 9/38* (2018.01)
- *G06F 15/80* (2006.01)
- *G06F 17/15* (2006.01)
- *G06K 9/00* (2006.01)
- *G06N 3/04* (2006.01)
- *G06K 9/46* (2006.01)

(52) U.S. Cl.
CPC .......... *G06F 3/0683* (2013.01); *G06F 9/3867* (2013.01); *G06F 15/80* (2013.01); *G06F 17/153* (2013.01); *G06K 9/00973* (2013.01); *G06K 9/00986* (2013.01); *G06K 9/00993* (2013.01); *G06K 9/4628* (2013.01); *G06K 9/627* (2013.01); *G06K 9/6232* (2013.01); *G06N 3/0454* (2013.01)

(56) References Cited

U.S. PATENT DOCUMENTS

| | | |
|---|---|---|
| 6,948,050 B1 | 9/2005 | Gove et al. |
| 8,108,622 B2 | 1/2012 | Nonogaki et al. |
| 2005/0257026 A1 | 11/2005 | Meeker |
| 2006/0212613 A1 | 9/2006 | Stewart |
| 2007/0245123 A1 | 10/2007 | Stuttard et al. |
| 2008/0162802 A1 | 7/2008 | Akiyama et al. |
| 2008/0235490 A1 | 9/2008 | Jones et al. |
| 2009/0220156 A1* | 9/2009 | Ito .................. G06K 9/00248 382/201 |
| 2012/0303932 A1 | 11/2012 | Farabet et al. |
| 2013/0307859 A1* | 11/2013 | Johnson ................ G06T 1/60 345/501 |

OTHER PUBLICATIONS

International Search Report dated Oct. 26, 2016 in PCT/US2016/043781.

International Written Opinion dated Oct. 26, 2016 for PCT/US2016/043781.

Thierry Lepley et al., "A novel compilation approach for image processing graphs on a many-core platform with explicitly managed memory," Proceedings of the 2013 Conference on Compilers, Architectures and Synthesis for Embedded Systems, Sep. 30, 2013, pp. 1-10.

\* cited by examiner

*Figure 11*

PERFORMANCE ENHANCEMENT FOR TWO-DIMENSIONAL ARRAY PROCESSOR

RELATED APPLICATIONS

This application claims the benefit of U.S. Provisional Application No. 62/195,921, entitled "Mireplica Visual-Processing Architecture: Convolutional Neural Networks" and filed on Jul. 23, 2015, which application is hereby incorporated by reference in its entirety and for all purposes as if completely and fully set forth herein.

BACKGROUND

Many applications involve two-dimensional data sets. Visual processing applications are one example. The term "visual processing" as used herein refers to a general class of processing of image and video picture elements ("pixels") and related data. This includes applications such as enhancing images and converting pixels formats, motion detection and tracking, and identifying features or objects in either still-image or video frames. Other applications involving data that can be expressed in two-dimensional sets include modeling of physical quantities such as forces or electromagnetic fields. Three-dimensional data sets can in some cases be represented in two-dimensions, such as by projection or transformation into a two-dimensional plane, or as multiple adjacent two-dimensional data sets.

Convolutional neural networks encompass a large variety of detection and classification algorithms. Recently, two-dimensional (2D) convolutional neural networks (CNNs) have gained widespread attention for their ability to detect and classify a large number of image objects. CNNs have many different configurations, but the configurations are composed of basic elements that permit the network to be "trained" to recognize objects by adjusting network parameters and interconnection topologies to achieve a high level of detection reliability, typically over 90% in state-of-the-art implementations.

CNNs are generally classified as "deep" neural networks, often with four or more layers. A "convolutional" layer of a CNN generally has more output values than inputs, the outputs in turn becoming inputs to the next convolutional layer. As discussed further below, the resulting number of operations is quite large, and the number of clock cycles needed to perform a detection process on one input image frame can easily be on the order of one billion. Real-time image recognition is desirable for many applications, such as sign-reading for automatically-operated vehicles or face recognition in security situations. Accordingly, improvements in detection speed can greatly enhance the performance and capabilities of such image-recognition applications.

BRIEF DESCRIPTION OF THE DRAWINGS

The following detailed description of various disclosed embodiments makes reference to the accompanying drawings in which:

FIG. 11 is a diagram illustrating tile processor data memory storage during execution of an exemplary convolutional neural network with subsampling and vector concatenation;

DETAILED DESCRIPTION

Overview

Figure 1:
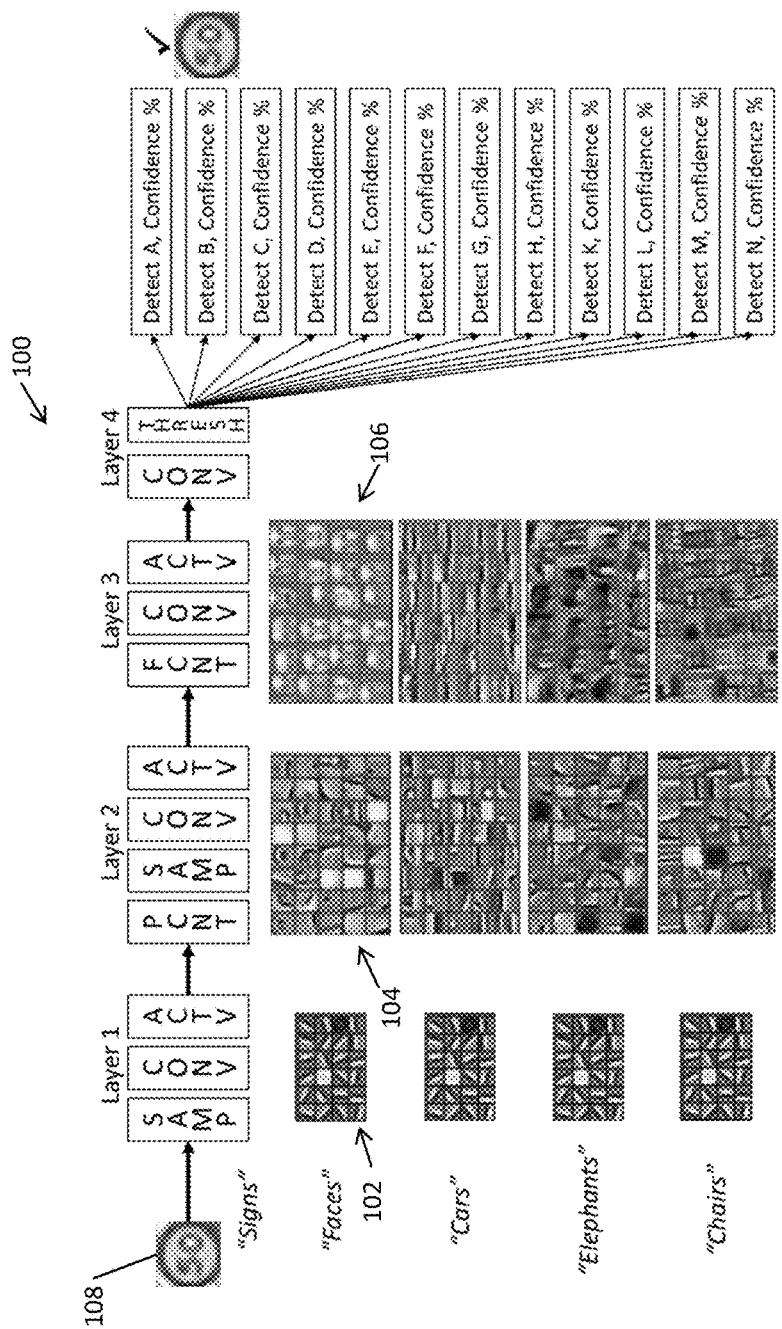
FIG. 1 is a simplified block diagram illustrating certain aspects of an exemplary convolutional neural network.

Methods and systems are disclosed for increased speed of processing operations on data in two-dimensional arrays, and for detecting a feature in an image. An embodiment of a processor-implemented method for detecting a feature in a two-dimensional image includes storing, in a set of data memories within a parallel processing system, first image data representing pixels of a first image. The parallel processing system includes a row of multiple substantially identical data processors connected by an instruction pipeline, where the instruction pipeline is adapted for sequential conveyance of instructions from a first one of the multiple data processors to each adjacent data processor in turn. Each of the data processors comprises a respective data memory of the set of data memories that the first image data is stored in. In addition, each of the data memories is partitioned to include multiple memory regions of substantially identical storage capacity, and storing the first image data comprises storing data representing successive vertical slices of the first image in respective adjacent memory regions of the data memories of the parallel processing system.

This embodiment of the method continues with storing, in a memory of a host processor coupled to the parallel processing system, feature kernel data comprising weight data representing a set of weight matrices. The method further includes, for each of multiple selected pixels within the first image, performing a set of convolutions over a two-dimensional pixel region including the selected pixel and applying a nonlinear function to a result of each convolution to produce a feature map pixel corresponding to the selected pixel. Each convolution in the set of convolutions is performed using a respective one of the set of weight matrices, and a feature map pixel is produced for each of the weight matrices. The method continues with storing, for each of the weight matrices, a feature map comprising all of the feature map pixels, where storing the feature map comprises storing data representing separate pixels of the feature map in respective separate memory regions of the data memories of the parallel processing system. For each pixel of a feature map, data representing the corresponding pixel from each of the feature maps produced using all of the weight matrices is stored in the same memory region. This embodiment of the method further includes processing the feature maps to produce a decision as to whether a particular feature or class of features is detected within the first image.

In a further embodiment of the above method, the feature kernel data further includes bias data representing a bias value associated with each weight matrix in the set of weight matrices, and each one of the set of convolutions is performed using the bias value associated with the respective one of the set of weight matrices. In an embodiment, performing the set of convolutions for each of the multiple selected pixels comprises sequentially executing, in adjacent data processors of the parallel processing system, instructions for performing the sets of convolutions. In a further embodiment, a single iteration of sequentially executing the instructions in adjacent data processors of the parallel processing system comprises performing the set of convolutions for all selected pixels within one horizontal row of the first image.

In a further embodiment of this method, the multiple selected pixels consist of pixels spaced apart, in horizontal and vertical directions within the first image, by a number of pixels defined by an integer sub sampling factor n. In a still further embodiment, a single iteration of sequentially executing the instructions in adjacent data processors of the parallel processing system comprises performing the set of convolutions for all selected pixels within n horizontal rows of the first image, where the n horizontal rows are adjacent rows within a series of horizontal rows spaced n pixels apart.

In a further embodiment, storing the feature map also includes, during a single iteration of sequentially executing the instructions in adjacent data processors, storing feature map pixels corresponding to selected pixels in the uppermost of the n horizontal rows of the first image in a first group of adjacent memory regions of data processors within the parallel processing system, where the first group of adjacent memory regions are in data processors positioned closest to the beginning of the instruction pipeline of the parallel processing system. In this embodiment, storing the feature map also includes, during the single iteration of sequentially executing the instructions in adjacent data processors, storing feature map pixels corresponding to selected pixels in a next lower row of the n horizontal rows of the first image in a next group of adjacent memory regions adjacent to the first group of adjacent memory regions, where the next group of adjacent memory regions are in data processors positioned further along the instruction pipeline of the parallel processing system. This embodiment also includes, during the single iteration of sequentially executing the instructions in adjacent data processors, storing feature map pixels corresponding to selected pixels in any additional lower rows of the n horizontal rows in successive groups of adjacent memory regions in data processors positioned further along the instruction pipeline of the parallel processing system.

In another embodiment, storing the feature map includes, during a single iteration of sequentially executing the instructions in adjacent data processors, storing each feature map pixel in a first series of n feature map pixels corresponding to the first selected pixel in each of the n horizontal rows, in order from the uppermost to the lowermost of the n horizontal rows, in a respective adjacent memory region of the data processors in the parallel processing system. These feature map pixels are stored in memory regions beginning with the first memory region of the data processor positioned closest to the beginning of the instruction pipeline of the parallel processing system. In this embodiment, storing the feature map also includes, during the single iteration of sequentially executing the instructions in adjacent data processors, storing each feature map pixel in a second series of n feature map pixels corresponding to the second selected pixel in each of the n horizontal rows, in order from the uppermost to the lowermost of the n horizontal rows, in a respective adjacent memory region of the data processors in the parallel processing system. In addition, storing the feature map includes, during the single iteration of sequentially executing the instructions in adjacent data processors, storing each feature map pixel in any additional series of n feature map pixels corresponding to additional selected pixels in each of the n horizontal rows, in order from the uppermost to the lowermost of the n horizontal rows, in a respective adjacent memory region of the data processors in the parallel processing system, beginning with the memory region immediately following the memory region storing the last feature map pixel in the previous series of feature map pixels.

In an embodiment of the method for detecting a feature in a two-dimensional image, processing the feature maps to produce a decision includes rearranging the stored data representing the feature map pixels so that data representing feature map pixels corresponding to selected pixels having the same horizontal position in the first image is all stored within the same memory region of the data processors in the parallel processing system. In this embodiment, processing the feature maps also includes, for each of multiple selected feature map pixels within each feature map, subsequently performing an additional set of convolutions over a two-dimensional feature map pixel region including the selected feature map pixel, wherein each one of the additional set of convolutions is performed using a respective one of an additional set of weight matrices stored in the memory of the host processor. In another embodiment, the first image constitutes a horizontal slice of a larger image, and the method further includes, subsequent to completion of the set of convolutions for first image data representing an uppermost row of the first image, overwriting the first image data representing the uppermost row of the first image with data representing a row of the larger image just below the lowest row of the larger image previously included in the first image.

An embodiment of a data processing system for detecting a feature in a two-dimensional image includes a row of substantially identical data processors, where the data processors are connected by an instruction pipeline adapted for sequential conveyance of instructions from a first one of the multiple data processors to each adjacent data processor in turn, and each of the data processors includes a data memory partitioned to include multiple memory regions of substantially identical storage capacity. This embodiment of the data processing system further includes a host processor coupled to the row of data processors, where the host processor includes a data memory adapted to store feature kernel data comprising weight data representing a set of weight matrices and bias data representing a bias value for each weight matrix within the set of weight matrices. The host processor further includes a control module adapted to fetch and provide to the instruction pipeline instructions for execution by the multiple data processors, and stored program instructions which, when provided to the instruction pipeline and executed by the row of data processors, are operable to implement certain steps of the method described above for detecting a feature in a two-dimensional image.

In a further embodiment of the data processing system, the control module includes an instruction generation unit coupled to the host processor and to the row of data processors. The instruction generation unit is adapted to provide an interface between the host processor and the row of data processors, and to translate custom compiler instructions received from the host processor into instructions executable by the data processors in the row of data processors.

An embodiment of a processor-implemented method for increased speed of processing operations on data in two-dimensional arrays comprises storing, in a set of data memories within a parallel processing system, first array data representing elements of a first array. The parallel processing system includes a row of multiple substantially identical data processors connected by an instruction pipeline adapted for sequential conveyance of instructions from a first one of the multiple data processors to each adjacent data processor in turn. Each of the data processors includes a respective one of the set of data memories, and each of the data memories is partitioned to include multiple memory regions of substantially identical storage capacity. In this embodiment of the method, storing the first array data comprises storing data representing successive columns of the first array in respective adjacent memory regions of the data memories of the parallel processing system.

The method for increased speed of processing operations further includes, for each of multiple selected elements within the first array, performing a processing operation on the selected element to produce an output element corresponding to the selected element. In this embodiment, the multiple selected elements consist of elements spaced apart, in horizontal and vertical directions within the first array, by a number of elements defined by an integer subsampling factor n. Performing the processing operation for each of the multiple selected elements comprises sequentially executing, in adjacent data processors of the parallel processing system, instructions for performing the processing operation, and a single iteration of sequentially executing the instructions in adjacent data processors of the parallel processing system comprises performing the processing operation for all selected elements within n horizontal rows of the first array, where the n horizontal rows are adjacent rows within a series of horizontal rows spaced n elements apart. The method further includes storing an output array comprising all of the output elements, where storing the output array comprises storing data representing separate elements of the output array in respective separate memory regions of the data memories of the parallel processing system.

In a further embodiment of the method for increased speed of processing operations, performing the processing operation comprises performing one or more convolutions over a two-dimensional element region including the selected element, and each one of the one or more convolutions is performed using a coefficient matrix stored in a data memory of a host processor coupled to the parallel processing system.

In another embodiment of the method for increased speed of processing operations, storing the output array further includes, during a single iteration of sequentially executing the instructions in adjacent data processors, storing output elements corresponding to selected elements in the uppermost of then horizontal rows of the first array in a first group of adjacent memory regions of data processors within the parallel processing system. The first group of adjacent memory regions is in data processors positioned closest to the beginning of the instruction pipeline of the parallel processing system. In this embodiment, storing the output array further includes, during the single iteration of sequentially executing the instructions in adjacent data processors, storing output elements corresponding to selected elements in a next lower row of the n horizontal rows of the first array in a next group of adjacent memory regions adjacent to the first group of adjacent memory regions. The next group of adjacent memory regions is in data processors positioned further along the instruction pipeline of the parallel processing system. Storing the output array also includes, during the single iteration of sequentially executing the instructions in adjacent data processors, storing output elements corresponding to selected elements in any additional lower rows of the n horizontal rows in successive groups of adjacent memory regions in data processors positioned further along the instruction pipeline of the parallel processing system.

In another embodiment of the method, storing the output array further includes, during a single iteration of sequentially executing the instructions in adjacent data processors, storing each output element in a first series of n output elements corresponding to the first selected element in each of the n horizontal rows, in order from the uppermost to the lowermost of the n horizontal rows, in a respective adjacent memory region of the data processors in the parallel processing system. The output elements are stored in memory regions beginning with the first memory region of the data processor positioned closest to the beginning of the instruction pipeline of the parallel processing system. In this embodiment, storing the output array further includes, during the single iteration of sequentially executing the instructions in adjacent data processors, storing each output element in a second series of n output elements corresponding to the second selected element in each of the n horizontal rows, in order from the uppermost to the lowermost of then horizontal rows, in a respective adjacent memory region of the data processors in the parallel processing system. These output elements are stored in memory regions beginning with the memory region immediately following the memory region storing the last output element in the first series of output elements. Storing the output array also includes, during the single iteration of sequentially executing the instructions in adjacent data processors, storing each output element in any additional series of n output elements corresponding to additional selected elements in each of the n horizontal rows, in order from the uppermost to the lowermost of the n horizontal rows, in a respective adjacent memory region of the data processors in the parallel processing system. These output elements are stored in memory regions beginning with the memory region immediately following the memory region storing the last output element in the previous series of output elements.

In another embodiment, the method for increased speed of processing operations further comprises rearranging the stored data representing the output elements so that data representing output elements from the same column of the output array is all stored within the same memory region of the data processors in the parallel processing system, and, for each of multiple selected output elements within the output array, subsequently performing an additional processing operation on the selected output element.

An embodiment of a data processing system for increased speed of processing operations on data in two-dimensional arrays includes a row of substantially identical data processors, where the data processors are connected by an instruction pipeline adapted for sequential conveyance of instructions from a first one of the multiple data processors to each adjacent data processor in turn. Each of the data processors includes a data memory partitioned to include multiple memory regions of substantially identical storage capacity. The system further includes a host processor coupled to the row of data processors, where the host processor includes a data memory adapted to store fixed data for use in processing operations on array data stored in the data memories of the row of data processors. The host processor further includes a control module adapted to fetch and provide to the instruction pipeline instructions for execution by the multiple data processors, and stored program instructions which, when provided to the instruction pipeline and executed by the multiple data processors, are operable to implement certain steps of the method described above for increased speed of processing operations.

In a further embodiment of the data processing system, the control module comprises an instruction generation unit coupled to the host processor and to the row of data processors, where the instruction generation unit is adapted to provide an interface between the host processor and the row of data processors, and to translate custom compiler instructions received from the host processor into instructions executable by the data processors. In another embodiment of the system, performing the processing operation comprises performing one or more convolutions over a two-dimensional element region including the selected element, and each one of the one or more convolutions is performed using a coefficient matrix stored in the data memory of the host processor.

The methods and systems described herein result in substantial improvement in the speed of 2D CNN implementations and other operations on two-dimensional arrays involving subsampling. Certain aspects of a novel tile processor architecture described herein are explained further in commonly owned U.S. patent application Ser. No. 13/602,958, now U.S. Pat. No. 9,183,614, and U.S. patent application Ser. No. 15/054,118, each of which is hereby incorporated by reference herein in its entirety. Unlike other approaches, the tile processor architecture permits simultaneous processing across the entire width of the image frame, and supports low-latency communication throughout the neural network, including the distribution of a very large number of network parameters with essentially no communication overhead. Furthermore, the architecture provides opportunities for data reorganization that enables parallelism beyond what is possible with existing solutions—up to a factor of at least 4 times the parallelism. In an embodiment, the CNN is directly implemented by a single-threaded C++ source program.

CNN Overview

CNNs are very computation- and communication-intensive, and operate on contexts that are very difficult to partition across parallel processing elements. FIG. 1 illustrates generalized components of an example CNN based on reference code provided for the Embedded Processor Architecture course at Eindhoven University of Technology, available at https://sites.google.com/site/5kk73gpu2013/assignment/cnn (this particular example detects and classifies traffic signs). The neural network 100 consists of four layers, labeled Layer 1 through Layer 4. Each layer employs a number of feature maps that determine, for pixels in the input image and for each feature map, to what degree a region defined by a pixel (in this case, the region with the pixel at its top-left corner) matches the feature map. This is roughly analogous to a neuron making this determination at each position, hence the term "neural network." Exemplary sets of possible feature maps are shown in FIG. 1. Set 102 of 24 feature maps can be used in Layer 1, set 104 of 40 feature maps can be used in Layer 2, and set 106 of 24 feature maps can be used in Layer 3. In the embodiment of FIG. 1, the feature maps used in successive layers represent progressively more complex features. This is often the case in convolutional neural networks. As labeled in FIG. 1, feature map sets 102, 104 and 106 are used for recognition of faces. Other exemplary feature map sets suitable for recognition of other objects are shown in FIG. 1. Although not shown in FIG. 1, similar feature map sets suitable for recognition of traffic signs would be used for recognition of input image 108, a traffic sign. Feature maps as illustrated in FIG. 1 are fixed data, and may also referred using other terms, such as "feature detectors." The term "feature map" may also be used to describe the output "image" that results from the comparison of a feature map to the input image.

With this comparison of an image portion to a feature map as the basic concept used for object detection, there are number of underlying operations in the network implementation, as shown in FIG. 1:

Subsampling ("SAMP" in the figure). Image objects can be at varying distances from the viewport (i.e., viewing position), so the pattern matching must consider a range of distances in matching features. This is accomplished by subsampling the image at various layers, which places image information (with some acceptable loss) into denser representations (smaller width and height). The final layer, Layer 4, compares a summary of all layers to indicate whether an object has been detected at a given position, and optionally to classify the object (for example, the speed indicated on a sign).

2D convolution ("CONV" in the figure). This is the basic operation for matching regions of the image to the feature maps. The dimensions of these regions are fixed for any given network, but can vary from one layer to the next and one network to the next. This is part of the network design.

A non-linear activation function ("ACTV" in the figure). This function determines the degree to which the region matches the feature, and discards regions that don't have a match above a certain threshold (by discarding the output of the single pixel that defines the region, again in this case the top-left pixel). Optionally, it can assign relatively larger values to outputs that are further above the threshold, to emphasize these positions.

Partial interconnect of outputs from different feature maps from layer 1 ("PCNT" in the figure). This operation considers various combinations of feature-map comparisons from the previous layer, forming a richer set of information about the features that have matches in the previous layer.

Full interconnect of outputs from different feature maps from layer 2 ("FCNT" in the figure). This also forms a richer set of information, but results in many more combinations, so is done only in layer 3 in this example.

A final threshold computation ("THRESH" in the figure). This summarizes the "decision" made by the network at any given position—whether a feature is detected at that position. This is indicated by some value, after a final convolution, being greater than zero. If this is true, then other convolutions can be used to sort the detection into a certain class of detected object, with the magnitude of this convolution indicating the level of confidence in the classification.

Figure 2:
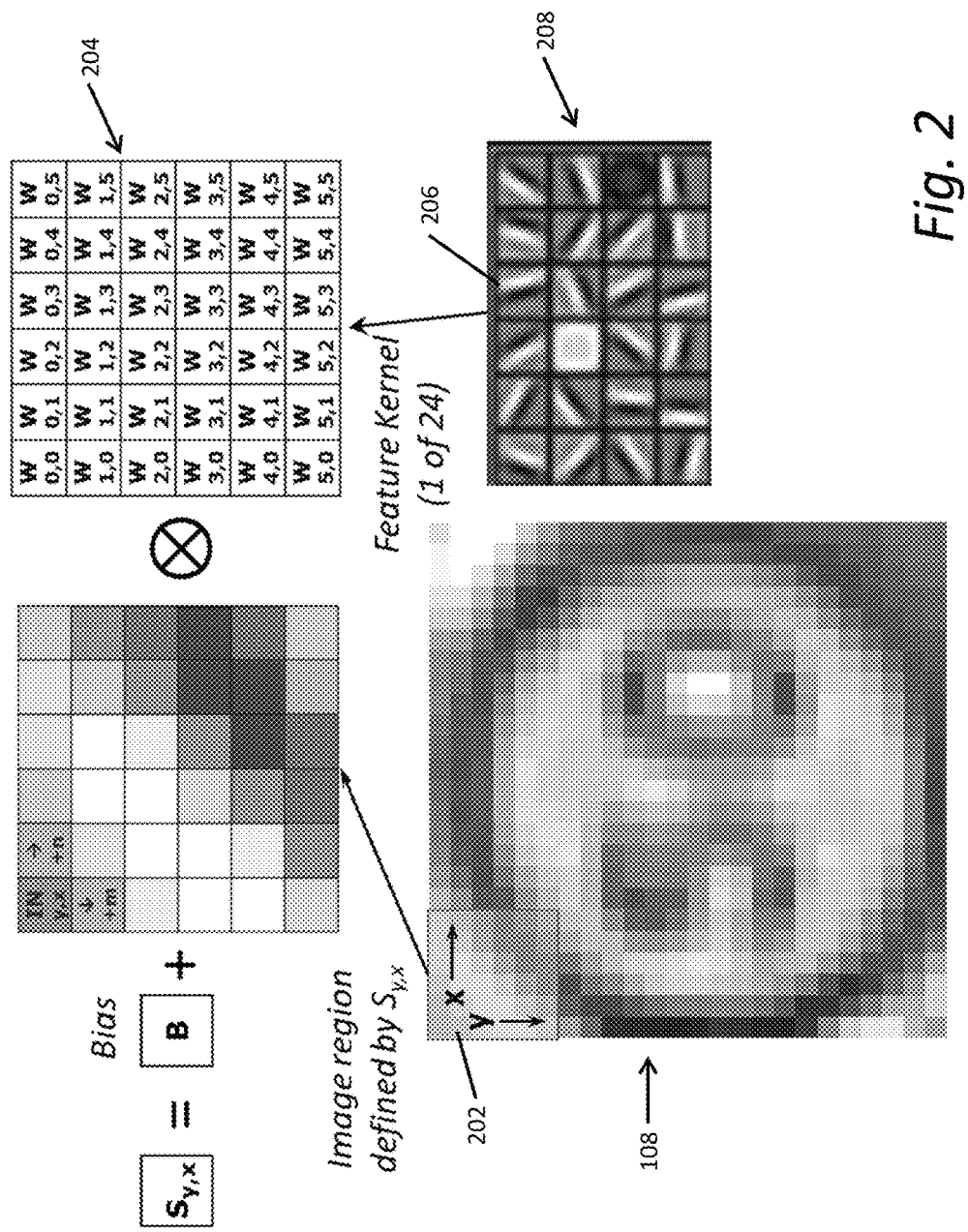
FIG. 2 is a diagram illustrating a convolution operation in a convolutional neural network.

The most time-consuming operation in a convolutional neural network such as that of FIG. 1 is the 2D convolution of the image data, illustrated in FIG. 2. This operation computes a signal output, $S_{y,x}$, at a given vertical position y and horizontal position x. The figure shows a 6×6 convolution, meaning that it computes the output using, for example, a region 202 within input image 108, where region 202 is 6 pixels high and 6 pixels wide, with x and y defined by the top-left corner. The various features being compared are defined by kernels, consisting of a bias B and a weight matrix $W_{m,n}$. In the embodiment of FIG. 2, weight matrix 204 has 36 elements $W_{y,x}$ representing the intensity variation of a feature map 206 within feature map set 208.

The convolution operation employed in CNNs is defined by the following equation:

$$S_{y,x} = B + \sum_{m=0}^{size} \sum_{n=0}^{size} IN_{y+m,x+n} * W_{m,n}$$

The convolution sums the products of image data with the corresponding elements of the weight matrix, resulting in a single value that is added to the bias to produce the signal. The convolution therefore results in an output signal value $S_{y,x}$ corresponding to the spatial position of the pixel having input intensity value $IN_{y,x}$. Informally, this operation produces a larger signal value for regions which have a higher degree of correspondence between pixel values and weight values. For example, if the image is lighter at the same positions that the weights have a higher value (also lighter), the product of the two has a relatively large value (and, applying a positive bias using negative weights results in relatively large values for darker regions that match). The larger the convolution sum, the higher the degree of match. The ACTV function discards convolution outputs that have relatively weak values, so they do not participate in further convolution layers.

Figure 3:
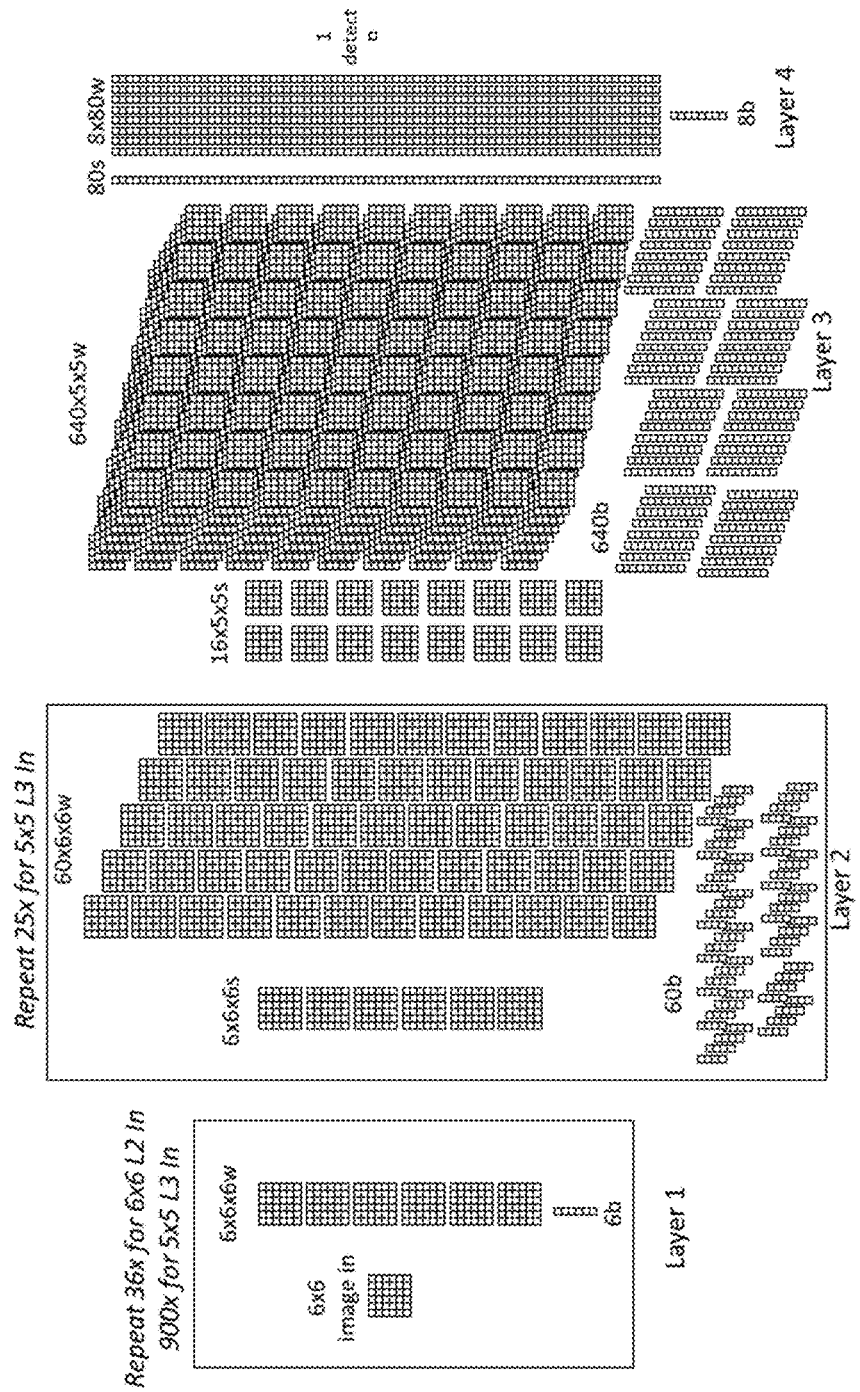
FIG. 3 is a diagram illustrating the number of image, signal, weight and bias elements that a detection output associated with a single pixel depends upon.

The convolution is computationally intense in and of itself, since it is performed across the entire image (in a test implementation described herein, an image 1280 pixels wide and 720 pixels high). However, this is only part of the operation's complexity. FIG. 3 illustrates the dependencies that a single output of the example network has, tracing from the output ("1 detect") back through the network, and considering all convolution kernels and interconnect operations (combinations of inputs sets result in more output sets than inputs sets depending on the number of combinations).

A single output classification depends on 38,280 signal elements ("s," including the input image), and 272,588 kernel elements (counting both bias "b" and weights "w"). Note that layer 2 has to be repeated 25 times to form the 5×5 signal inputs to layer 3, and layer 1 has to be repeated 36 times to form the 6×6 signal inputs to layer 2, or a total of 36*25=900 times to form the 5×5 inputs to layer 3. The output detection is formed at each output location, each with a different set of data dependencies. There is overlap in these dependencies, because adjacent outputs have adjacent context sets, but each one is unique.

A conventional implementation of the example network of FIG. 1 (using an nVidia GeForce GTX 460) requires approximately 1,400,000,000 cycles to execute on a frame of input image. In contrast, one embodiment of a mapping to the tiled architecture requires approximately 32,000,000 cycles for the same network, a factor of almost 44 times faster. This embodiment includes subsampling by a factor of two in layers 1 and 2, and a 2D convolution in all four layers. The underlying number of processing elements, and the operations, are comparable between the conventional implementation and the tile processor implementation, but there is a very large difference in how the dataflow is implemented—that is, how the data dependencies in FIG. 3 are satisfied.

Conventional processor solutions implement dataflow such that the signal and kernel data have to be communicated to the processing elements. This can be implemented by moving data from a shared memory to the processing elements (in general-purpose graphics processors), or by explicitly moving data between processing elements (in "vision processors"). This movement not only requires time to do the transfer, but also requires that the processing elements synchronize so that the transfers occur at a meaningful point in the program, which typically requires that the either the source or destination of the data stalls until the appropriate point is reached.

Figure 4:
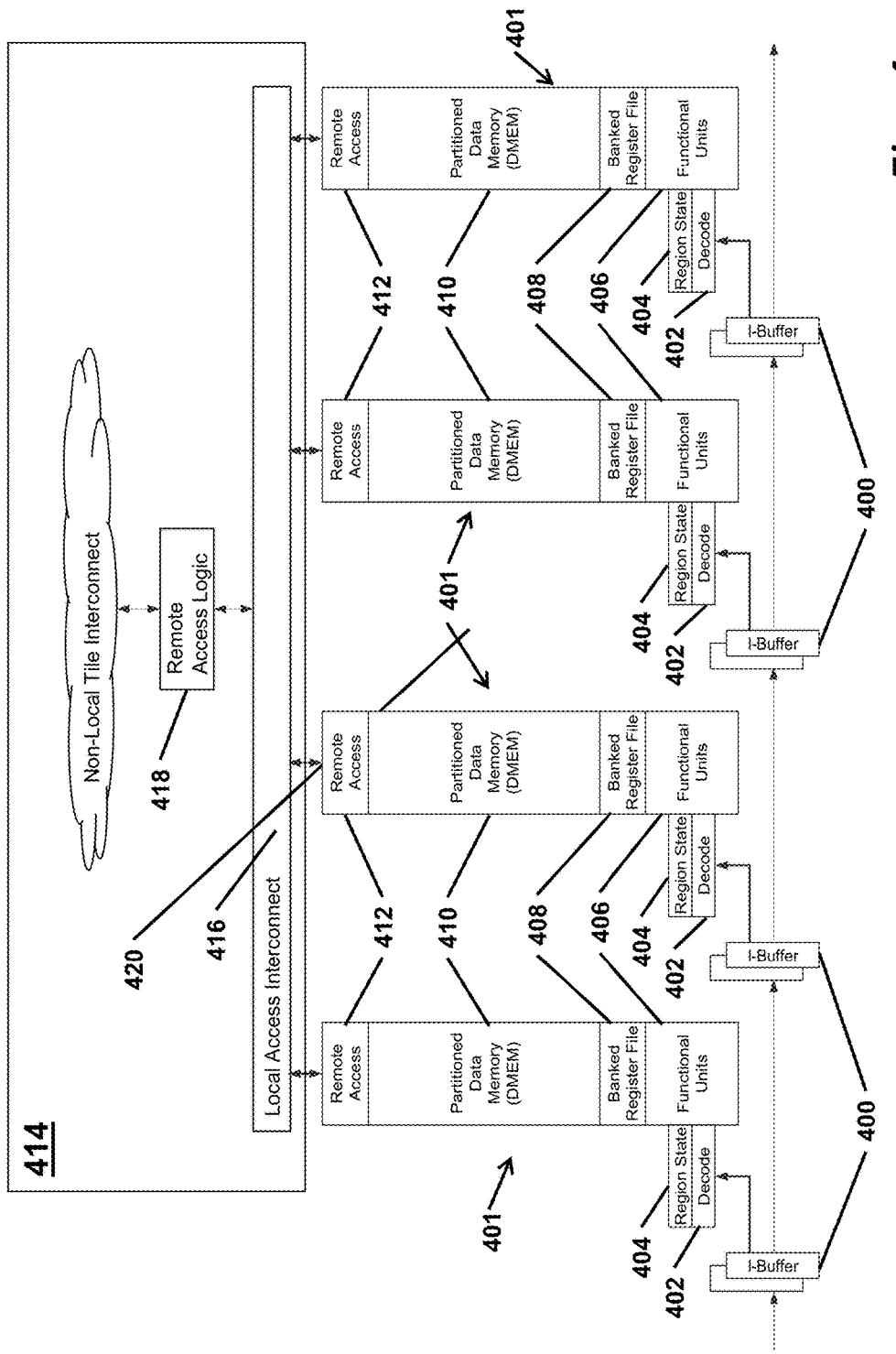
FIG. 4 is a simplified block diagram illustrating certain aspects of a tile processor dataflow implementation.

In contrast, in the systems and methods described herein, the tile processor array leaves all of the context (e.g., image data for surrounding pixels) in place, in local memory, in a way that is shared between all processing elements with little or no overhead for either data movement or synchronization. FIG. 4 illustrates key aspects of a tile processor array as used for the methods and systems described herein. A group of four interconnected tile processors 401 is shown. The term "tile" refers to a rectilinear region, or two-dimensional array, of pixels in a frame, that is either 4, 8, or 16 pixels wide and up to 256 pixels high. Each processing element, or tile processor, operates on a unique tile of pixels, with adjacent tiles mapped to adjacent tile processors. Although tile processing is described herein mainly for image processing applications, it should be understood that the disclosed embodiments are believed to be suitable for any applications involving data processing of two-dimensional data sets, particularly two-dimensional interrelated data sets.

The tile processor 401 has many components in common with a conventional processor, with the notable exception of having no instruction memory and no instruction fetch logic. The depiction of FIG. 4 is intended to illustrate the non-conventional components of tile processor 401, and depict the grouping of multiple tile processors 401. The arrangement of components of tile processor 401 may not reflect all interconnections between the components. Except as stated otherwise herein, tile processor 401 includes the components of a conventional processor (including, for example, power supplies), interconnected in the manner of a conventional processor as is known in the art. Instead of using conventional instruction memory and instruction fetch logic, tile processor 401 uses instructions that are fetched by a control module and distributed using an instruction pipeline composed of serial instruction buffer, or I-Buffer, registers 400 that couple all tile processors to the same sequence of instructions.

Instructions received in I-Buffer 400 are decoded by decode logic 402, and operations are performed on the contents of registers in banked register-file 408 by functional units 406, using loads and stores to fetch operands and write results into partitioned data memory 410 (DMEM). Particularly novel features of the tile processor include the region state logic 404, the register-file banking mechanism 408, the data-memory partitioning mechanism 410, remote access logic 412, tile interconnect network 414, and combinations of these. Network 414 is not shown as a discrete hardware block because it represents a fully connected network that couples all tile processors to the DMEM of all other tile processors. The remote access logic 412 of each tile processor couples to local access interconnect 416, which routes requests from any of the four tile processors to any of the others in a single cycle. The remote access logic 418 concurrently determines whether any request is not directed to a processor in the local group, and presents any such request to non-local tile interconnect 420, which couples this non-local request to the ultimate destination. Local access interconnect 416, remote access logic 418, and non-local tile interconnect 420 are specific levels of interconnect network 414.

Each datapath ("tile path") can access shared context by executing a load instruction that targets a memory in another tile path (or a different region of memory in the same tile path). This load is implemented in a way that ensures that the targeted data has been computed, normally without adding cycles to the instruction.

Figure 5:
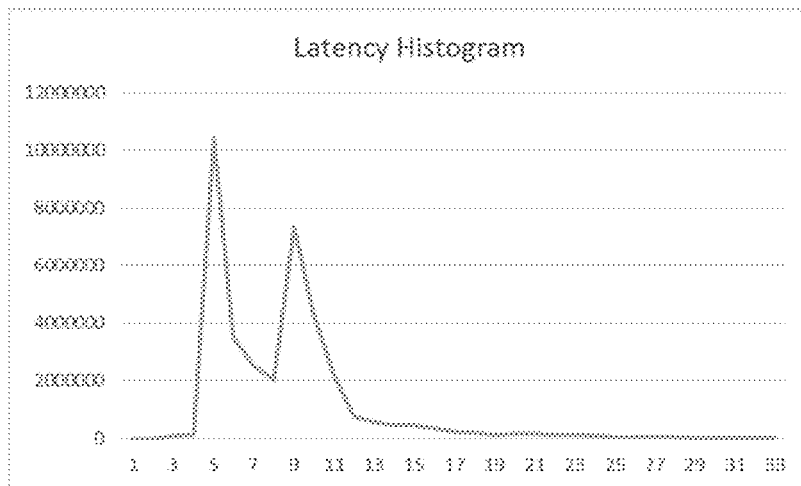
FIG. 5 is a histogram showing latency for data requests performed during operation of an exemplary CNN detection process.

FIG. 5 shows a histogram of the dataflow latency for signal traffic between tile paths in a first tile processor implementation embodiment. The round-trip latency is shown on the horizontal axis (cycles from the load request to the data response), and the number of accesses with the given latency is on the vertical axis. (There are two peaks in the histogram, because subsampling operations occur over large spans of data, and require more relatively remote communication.) Almost all requests are satisfied within 12 cycles, including synchronization. The tile paths multi-task across positions, in this case 4 positions, executing the same sequence of instructions 4 times. So, for example, a sequence of 4 instructions, at 3 other positions, provides adequate time to receive a response before it is required by the next sequence of instructions.

In addition to this low-overhead movement of data, the tile array has two further significant advantages in the dataflow implementation compared to conventional solutions. First, the data at each level of the network remains in place in the shared memory, and doesn't have to be communicated from one layer to the next. Conventional solutions require on the order of 35,000,000,000 data transfers of signal data to computing elements, as can be seen by extension of the dependencies shown in FIG. 3. In contrast, the tile array requires approximately 38,000,000 transfers in this embodiment (the total of the distribution in FIG. 5). Input data is transferred once, all network layers are performed on this input, and then any detections are output to a table. The only data transfers required are for subsampling and for accessing the signal regions for the convolution. No other transfers are required for layer interconnect or transferring data between network layers.

Second, this ability to operate on data that remains in place is due to the fact that the tile array requires no overhead to communicate kernel data. In more conventional solutions, this kernel data has to accompany the signal data, which requires either swapping kernel data or image data into the local memories of the computing elements. Kernel data is much larger than signal data—a total of 290,000,000,000 transfers. These are required because the total storage per computing element is 311,000 memory locations for all kernel data, too large to remain in place in multiple computing elements without inefficient memory usage.

Figure 6:
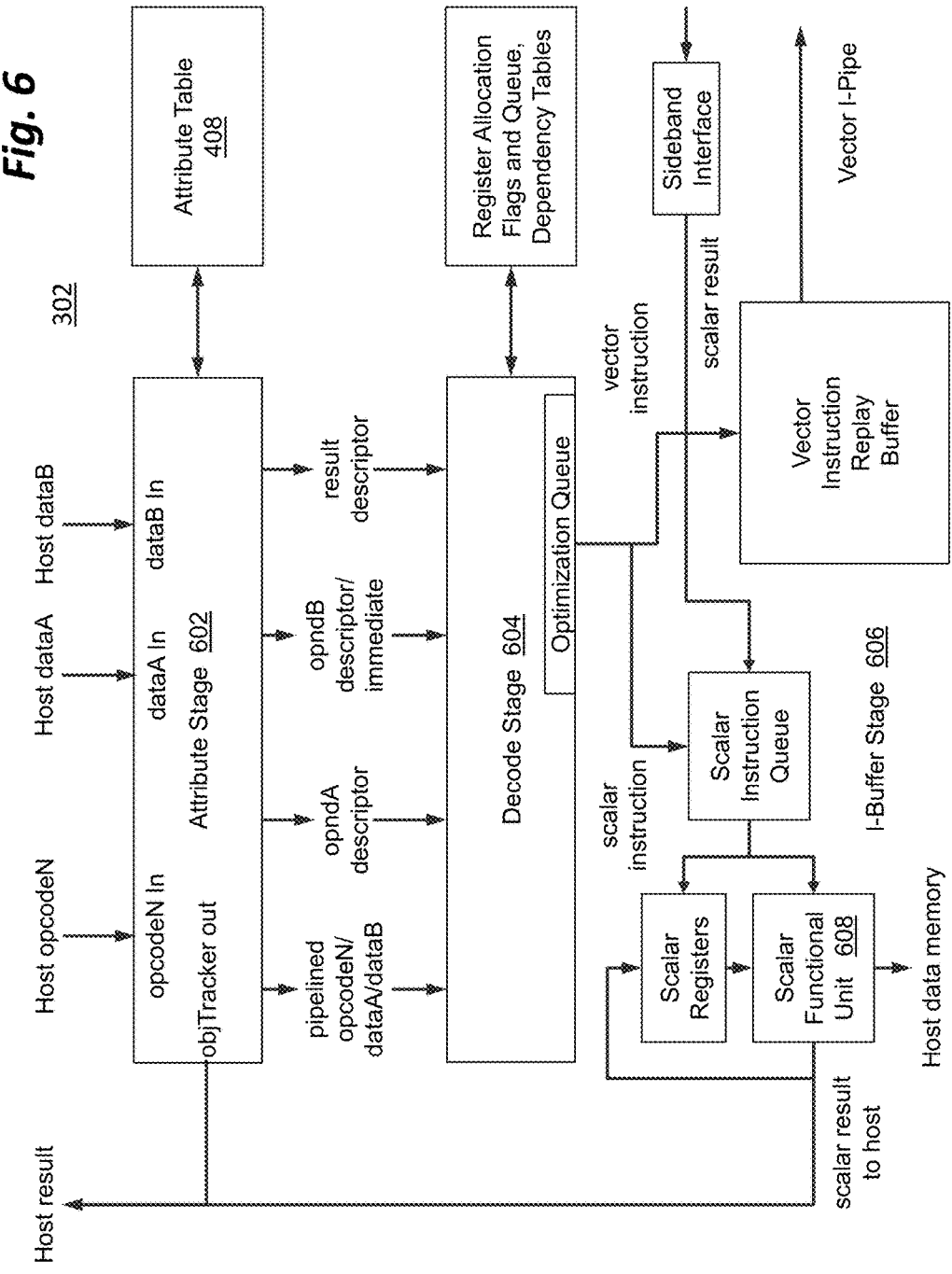
FIG. 6 is a simplified block diagram illustrating certain aspects of an embodiment of an instruction generation unit used in some embodiments with the tile processor described herein.

In the tile array, kernel data is in one memory location, in the host memory, and is communicated with no overhead to the tile paths. A block diagram illustrating an embodiment of an instruction generation unit (IGU) for interfacing between a host processor and a tile processor is shown in FIG. 6. The tasks involved in interfacing between a host processor and tile processor depend upon the nature of the program instructions to be executed. Even when a program has been specially adapted for execution by a tile processor, a control module to fetch instructions and provide them to the instruction pipeline of the tile processor with proper sequencing is needed. The IGU of FIG. 6 also performs translation of custom instructions from a conventional compiler to instructions suitable for execution by the tile processor. In this way, programs written for conventional processors may be executed using the tile processor.

The IGU is implemented as a functional unit in the host's datapath. This functional unit has a typical configuration in that it has two input operands—Host dataA and Host dataB—and returns a single result—Host result. The implementation of the IGU is distributed over three pipeline stages, corresponding to the upper, middle, and lower portions of the figure: Attribute Stage 602, Decode Stage 604, and I-Buffer Stage 606. The attribute stage implements the main interface to the host processor, receiving host opcode and dataA and dataB operands, and returning an object tracker result, where an object tracker identifies a multivalued vector generated by operation of the tile processors. This stage also assembles information required by the decode stage to convert the custom instructions from the host into tile-path instructions. The decode stage of the IGU receives instruction and attribute information from the attribute stage, and handles allocation and de-allocation of registers using register allocation flags and a register allocation queue. The decode stage also forms the instruction for the specialized processor and passes the instruction to the instruction buffer stage.

The I-buffer stage of the IGU includes scalar registers and a scalar functional unit for receiving scalar data from the specialized processor, operating on scalar data with other scalar operands provided by the host processor, and storing scalar results. The IGU is connected to the host data memory through scalar functional unit 608. The I-buffer stage also includes an optimization queue and an instruction replay buffer for managing execution of instructions by the specialized processor. In an embodiment having a tile array as the specialized processor, the I-buffer stage implements the instruction fetching and sequencing operations of a "master processor" described in U.S. Pat. No. 9,183,614. The instruction generation unit for the tile processor is described further in U.S. patent application Ser. No. 15/054,118, entitled "Hardware Instruction Generation Unit for Specialized Processors," filed Feb. 25, 2016, which application is incorporated by reference herein in its entirety and for all purposes.

For implementation of a CNN, kernel data consists of nothing but constant values, which vary depending on the class of objects being detected, but which do not vary for a given set of detections. Consequently, kernel data are part of the host program, stored as constants in host memory, and are provided directly on the "Host dataB" input port (used for immediate data). This data flows directly through the instruction pipeline ("Vector I-Pipe"), and is applied across all contexts with no communication or synchronization overhead.

CNN Optimization—Data Reorganization

Figure 7:
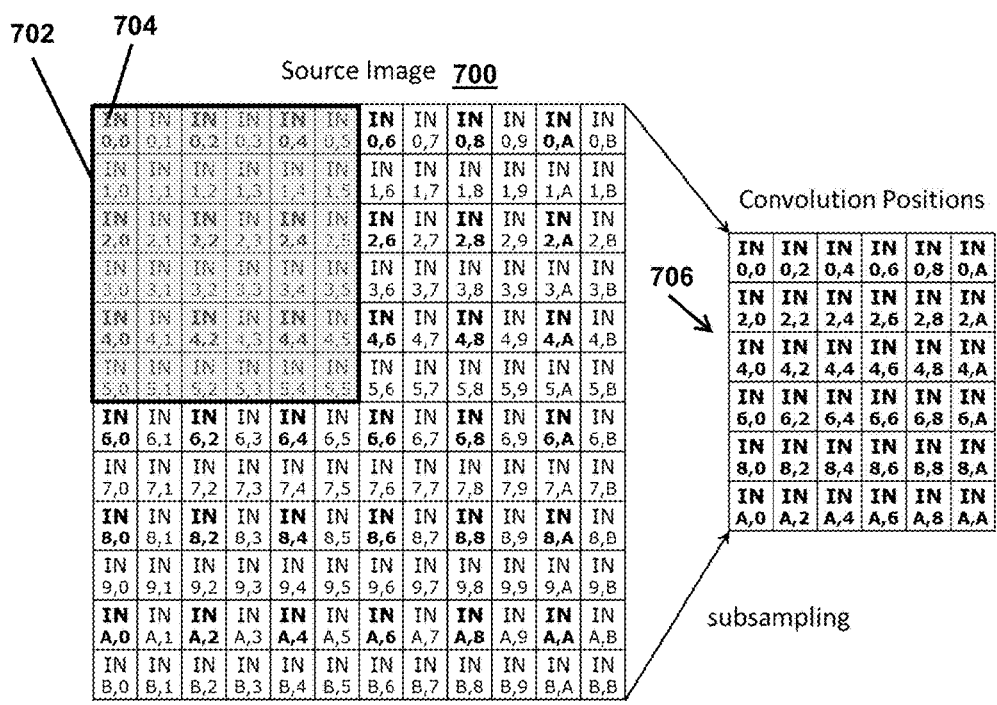
FIG. 7 is a diagram illustrating an exemplary subsampling operation in a convolutional neural network.

The dataflow capability of the tile array enables a unique optimization that adds some amount of dataflow overhead for a large increase in performance. The baseline implementation discussed so far, and having the latency results shown in FIG. 5 above, is based on a direct mapping of the example algorithm from the reference code described above to the tile-based programming model. This includes directly subsampling the inputs to layers 1 and 2, as illustrated by FIG. 7. There are various forms of subsampling, but this form simply performs convolutions on regions defined by every other input signal and on every other scan-line to form input to the convolution. FIG. 7 includes a source image 700, which could more generally be any two-dimensional data array. A convolution window 702 is used to perform a convolution at a selected pixel (or array element) for performing the convolution. For window 702, the selected pixel is pixel 704 at position 0,0. In the embodiment of FIG. 7, each pixel having even numbers for both row index y and column index x is a selected pixel for the convolution. The set of these selected pixels for source image 700 is shown in array 706.

Figure 8:
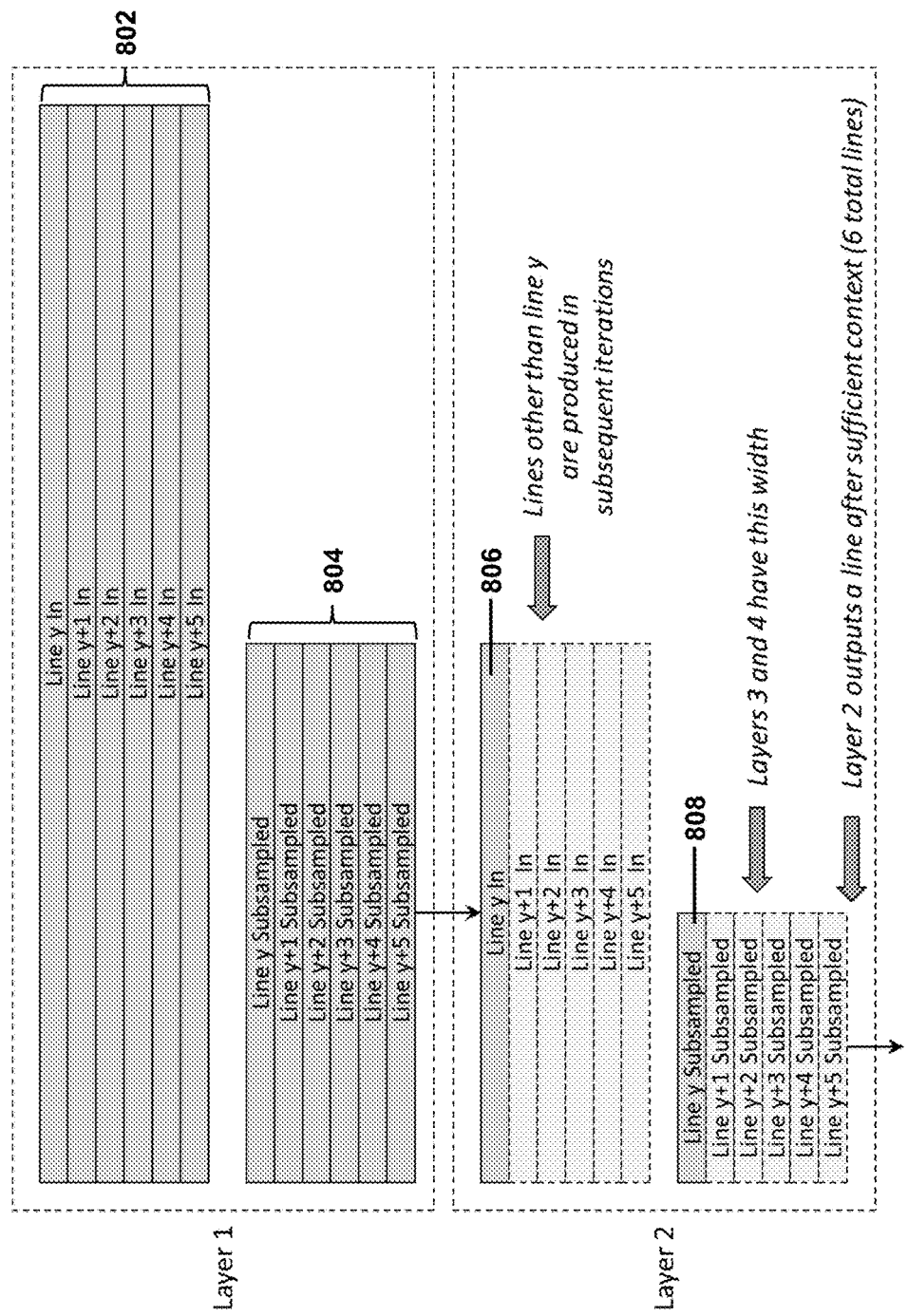
FIG. 8 is a diagram illustrating data vector widths resulting from subsampling operations in an exemplary convolutional neural network.

The convolution itself uses contiguous signal values, as shown by the shaded region of the input image within convolution window 702, but because the positions of the convolution regions are subsampled by a factor of two in both layers 1 and 2, the vector width at the output of each of these layers is reduced by a factor of two, as illustrated by FIG. 8. FIG. 8 illustrates operation of the convolutions in Layers 1 and 2 of the example CNN, from the standpoint of width of the row of elements available for processing at each stage. Within layer 1, row stack 802 represents incoming image data stored in the processor (in this case, in the data memories of the tile processors). Because the convolution in the example CNN is a 6×6 convolution, six input rows, from y to y+5, are needed to perform a first Layer 1 convolution. In an embodiment, the CNN processing is done on a continuous basis on a horizontal slice of the source image, storing as many rows at a time as are needed to perform the convolutions. In such an embodiment, when upper rows of the stored image data are no longer needed, they may be overwritten by new rows of image data. Similarly, signal data resulting from a convolution may also be retained as a horizontal slice with a number of rows needed to perform the next layer of convolutions.

Row stack 804 in FIG. 8 illustrates, from the standpoint of vector width, the fraction of the image data pixels that are selected pixels for the layer 1 convolutions. When the layer 1 convolutions are carried out on selected pixels in row y of layer 1, the resulting signal values become input row 806 (line y) in layer 2. Spaces for subsequent input rows in layer 2 are shown below row 806; these rows are generated when sufficient input data is received in layer 1 to perform convolutions starting on additional rows. Because in the embodiment of FIG. 8 layer 2 also subsamples by a factor of 2, row 808, representing the fraction of input line y pixels that are selected pixels for the layer 2 convolution, is half as wide as row 806.

Figure 9:
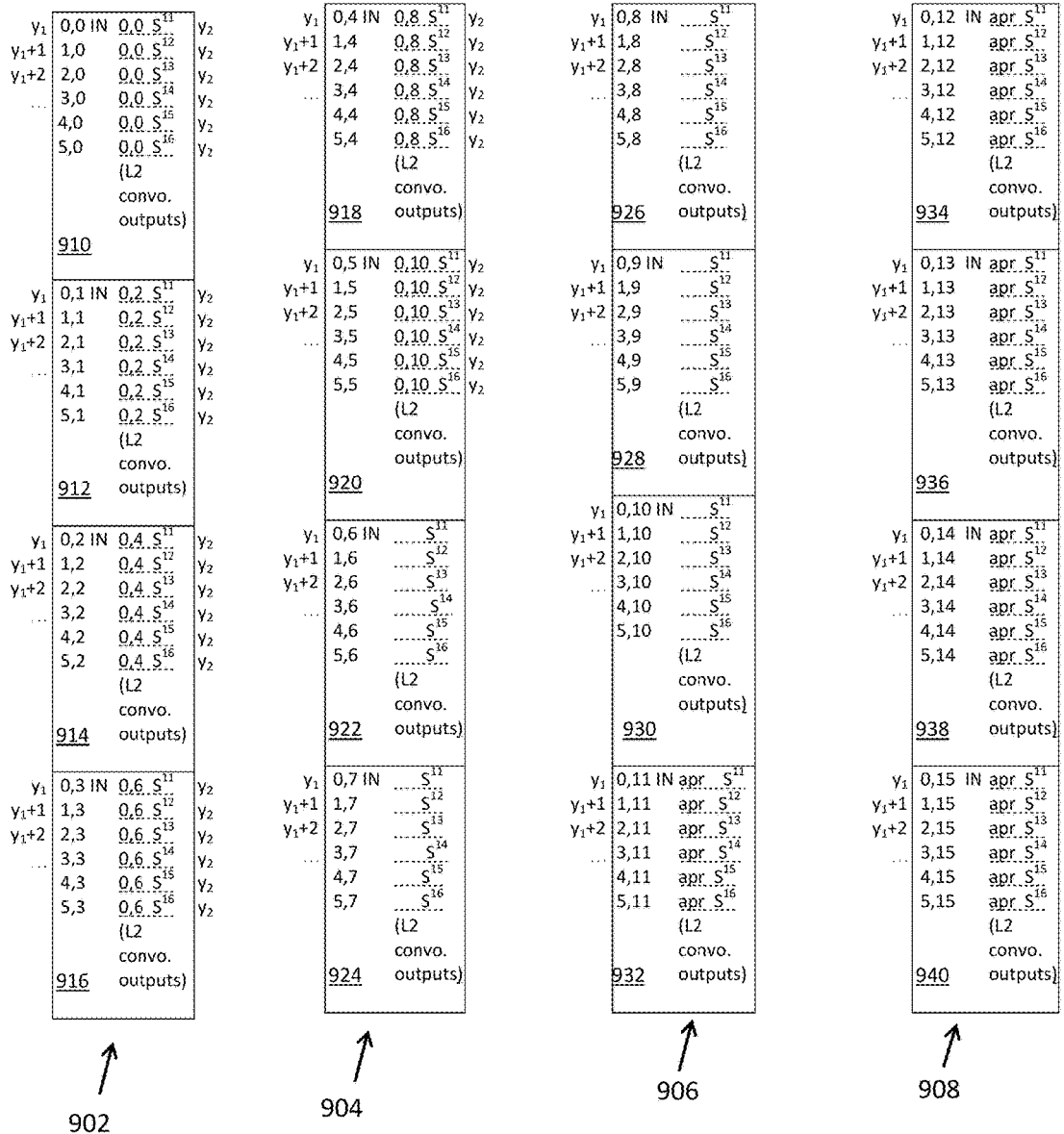
FIG. 9 is a diagram illustrating tile processor data memory storage during execution of an exemplary convolutional neural network with subsampling.

An illustration of data storage in tile processor data memories when performing a convolution with subsampling such as that described above is shown in FIG. 9. The columns in FIG. 9 represent four data memories 902, 904, 906 and 908. These are similar to data memories 410 of the tile processor array of FIG. 4, but the surrounding tile processors and the interconnections between them are not shown in FIG. 9. In the embodiment of FIG. 9, the instruction pipeline connecting the data processors moves from left to right, so that data memory 902 is in the data processor closest to the beginning of the instruction pipeline. Each of the data memories is partitioned into four memory regions, such as regions 910, 912, 914 and 916 of data memory 902. Along the left side of each of the memory regions of FIG. 9 is a column of image data, denoted with "IN" at the top, and referenced by y,x position in the source image. The way that image data, or other two-dimensional array data, is stored in tile processors is by mapping pixels or elements at each horizontal position to successive memory regions while moving horizontally across the image. Therefore, the pixels in region 910, the first region of first processor 902, have an x index of 0, while pixels in the next region, 912, have an x index of 1, and so on throughout the group of data memories, moving from the region at the bottom of one memory to the region at the top of the next. In the embodiment of FIG. 9, the source image is 16 pixels wide, so that x ranges from 0 to 15. Other tile processor arrays may of course have more data processors, and data memories may also be partitioned into a greater number of regions, though the number of regions should be a power of two.

In addition to source image data, each of the data memories in FIG. 9 stores signal data resulting from the convolutions performed. These output elements may be referred to as feature map pixels herein, or as output elements for more generalized array processing operations. For the CNN implementation example described in this disclosure, there are 6 layer 1 feature maps, resulting in six layer 1 convolutions per selected pixel, and six resulting signal values. In the embodiment of FIG. 9, the notation $S^{11}$ refers to a signal output from layer 1, feature map 1, while $S^{12}$ denotes an output from layer 1, feature map 2. As noted in FIG. 9, signal outputs from the layer 2 convolution are also stored in the data memories. In an embodiment for which the image pixel data shown is the first data received from a source image, there have not been enough image rows received to produce any layer 2 convolution outputs.

As shown in FIG. 9, six rows of image data have been stored in each of the memory regions, and layer 1 convolutions have been performed for the selected pixels on the top row of the stored horizontal image slice. In this embodiment, the instructions to the tile processors have caused first tile processor 902 to perform convolutions starting at the first four selected pixels, those for a y index of 0 and x indices of 0, 2, 4 and 6. The signal data from these convolutions is stored sequentially in the 4 regions of tile processor 902. This operation continues across the tile processors until the processors "run out" of selected pixels at x=10. Because the convolution requires a window of 6 pixels in each direction, the $10^{th}$ horizontal pixel is the last one for which a convolution can be performed for this image, and the $11^{th}$ through $15^{th}$ regions have "apr" designations to note that they are in the "apron" and would not have signal data even in the absence of subsampling.

Because the convolutions require the five pixels to the right of the subsampled locations, tile processors 906 and 908 did not participate in the convolutions. In a more realistic scenario having a wider source image using more tile processors, the apron effect at the edge of the image would be minor. The loss of tile processor activity from a subsampling factor of two would amount to nearly half of the available processors in such a scenario, however.

Data processors in a tile processor are designed to work in parallel; they execute the same instructions, with an offset of one clock cycle between each adjacent processor. Since convolution operations are performed in parallel across the entire vector, the reduction in vector lengths shown in FIGS. 8 and 9 directly reduces the available parallelism by a factor of two at layer 2 and by another factor of two at layers 3 and 4. This impacts performance more than a factor of two, because layers 3 and 4 perform more total operations—a total of 640 convolutions per vector in layer 3 and 80 or 640 in layer 4 (depending on whether an object is detected), in contrast to 6 convolutions in layer 1 and 60 in layer 2.

The convolution operation is the same at each position, and in the tiled implementation is performed on data that is stationary in the data memory. There is no data communication required to interconnect or to communicate signal data between layers. For this reason, it is advantageous to reorganize subsampled vectors from multiple lines to appear within a single vector that is wider than the subsampled line. This adds some overhead for data reorganization, but permits the large number of convolutions in layers 2-4 to be performed for each reorganization operation.

Figure 10:
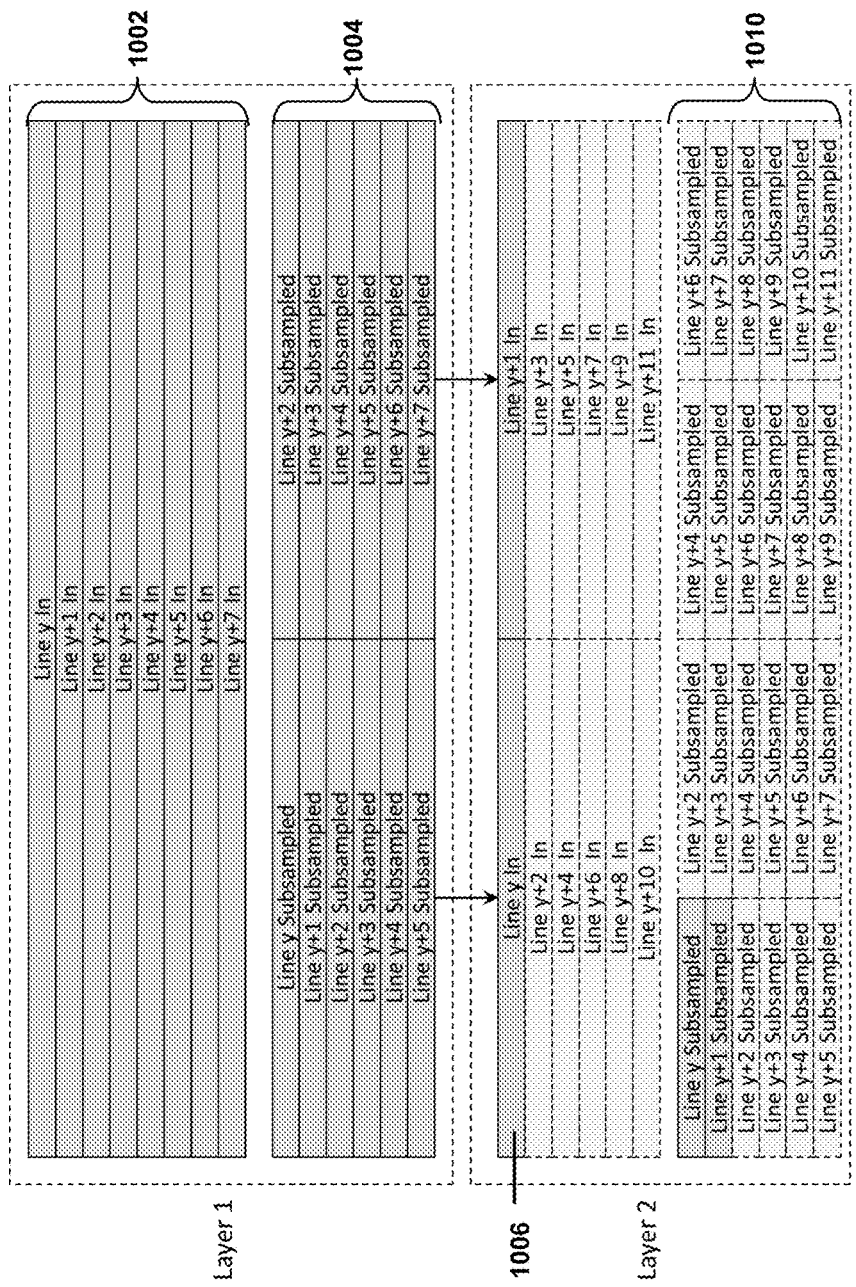
FIG. 10 is a diagram illustrating a data reorganization scheme providing improved parallelism and faster execution of an exemplary convolutional neural network.

In the embodiment of FIG. 10, the data in layer 1 is reorganized so that the vector organization in the vertical direction permits the vertical convolution to be done in parallel on the six lines y through y+5 and lines y+2 through y+7. This results in two adjacent output lines appearing within the same output vector. Within layer 2, a similar operation is performed, resulting in layer 2 output that has four adjacent lines appearing within the same output vector. Row stack 1002 of FIG. 10 is similar to stack 802 of FIG. 8, except that stack 1002 includes 8 image lines instead of 6. In order to do convolutions for two rows, line y and line y+2, during one tile processor iteration, the convolutions are delayed until two more lines are received so that there is enough data to perform the line y+2 convolutions. Row stack 1004 represents the selected pixels from both line y and line y+2; these are performed in one tile processor array iteration so that twice as many convolutions are done in parallel during the iteration. It is noted that the image data is not actually moved from one tile processor region to another to effect this reorganization at level 1. Instead, the tile processor array is programmed so that the processors on one side of the array perform convolutions on the selected pixels in row y, while the processors on the other side perform convolutions on the selected pixels in row y+2. After the iteration in which the convolutions for the selected pixels along lines y and y+2 are performed, the next iteration can start four lines lower, at the row combining lines y+4 and y+6.

Figure 11:
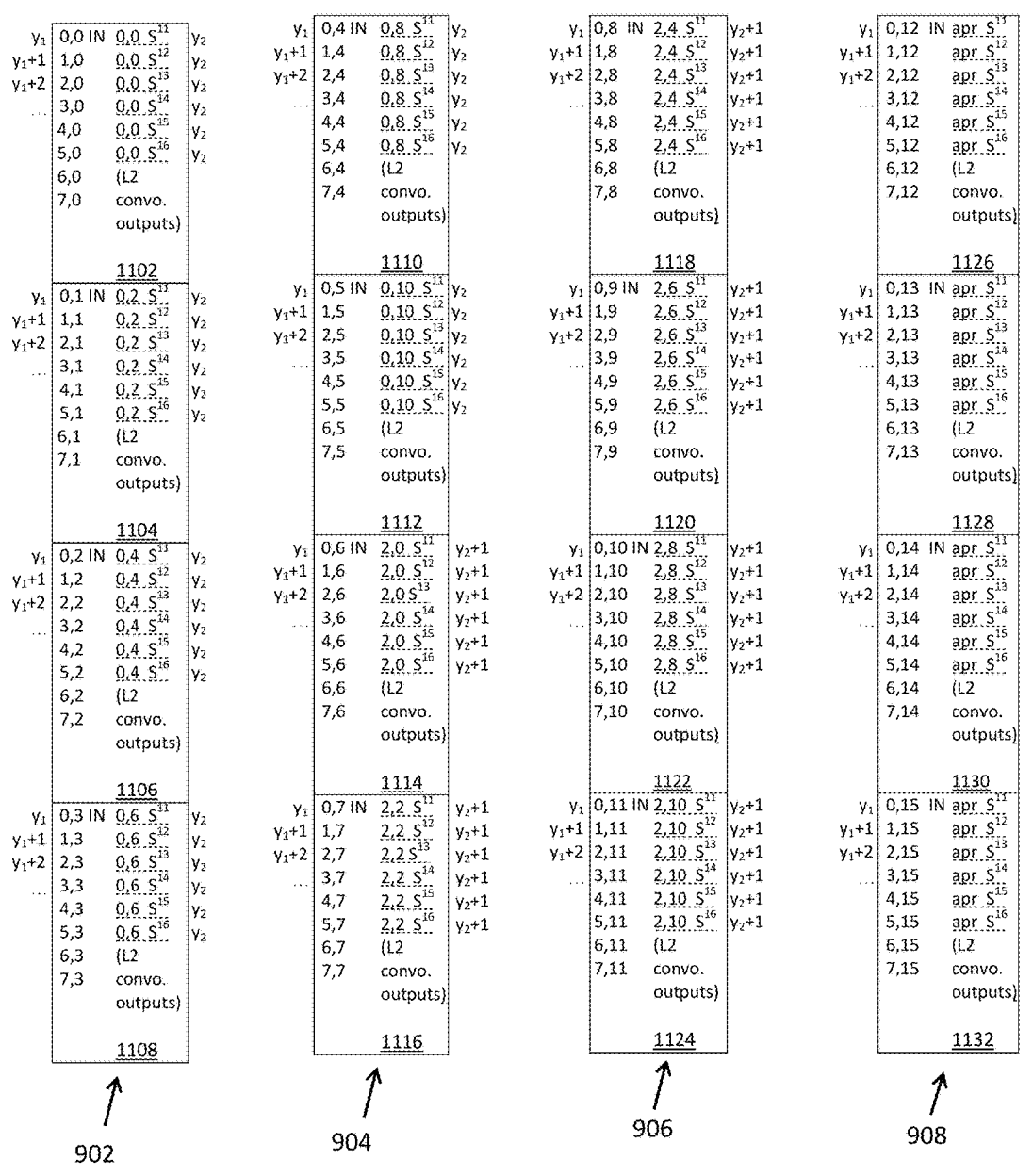

FIG. 11 illustrates an example of data storage in tile processor memories when implementing the layer 1 reorganization shown in FIG. 10. FIG. 11 depicts the same array of tile processor data memories shown in FIG. 9, but in the embodiment of Figure 1l the tile processors are programmed to perform the layer 1 convolutions using selected pixels along line y for the results stored in regions 1102 through 1112, and using selected pixels along line y+2 for the results stored in regions 1114 through 1124. Each of the memory regions includes 8 lines of image data rather than 6, and the first group of memory regions has signal data corresponding to the y=0 row of the source image, while the second group of memory regions has signal data corresponding to the y=2 row. On the left sides of the memory regions indices $y_1$ are shown for designating the input rows to layer 1 (in the source image), and on the right sides of the memory regions indices $y_2$ are shown for designating the input rows to layer 2 (in each of the layer 1 output feature maps). Because of the subsampling by a factor of two, the $y_1+2$ row in layer 1 becomes the $y_2+1$ row in layer 2.

Figure 12:
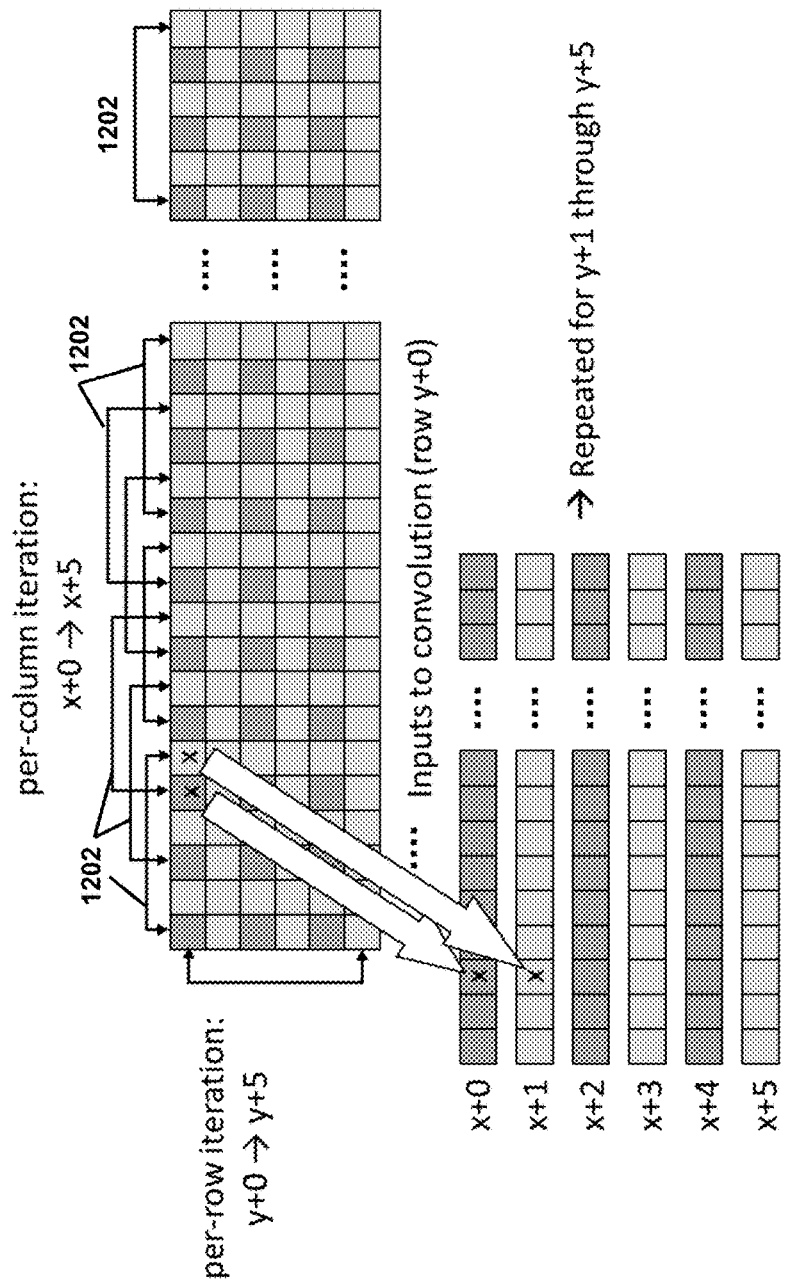
FIG. 12 is a diagram illustrating row and column inputs to an exemplary convolution operation in the absence of a data reorganization scheme.

To understand how this reorganization is done, it is useful to first understand how the data is subsampled for the baseline implementation, without reorganization. This is illustrated in FIG. 12. The horizontal convolution is performed across spans 1202 of 6 pixels ("per-column iteration"): for parallel operation on vectors, pixels are extracted from the input by subsampling with offsets of 0-5 from the subsampled positions. The figure highlights ("x") the pixels selected for the third subsampled position in the first two iterations of the horizontal convolution. The vertical convolution is accomplished by repeating the horizontal iteration across each of the 6 lines y+0 through y+5. Note that multiple convolutions (six in this example), using multiple kernels, are applied to the same subsampled data.

Figure 13:
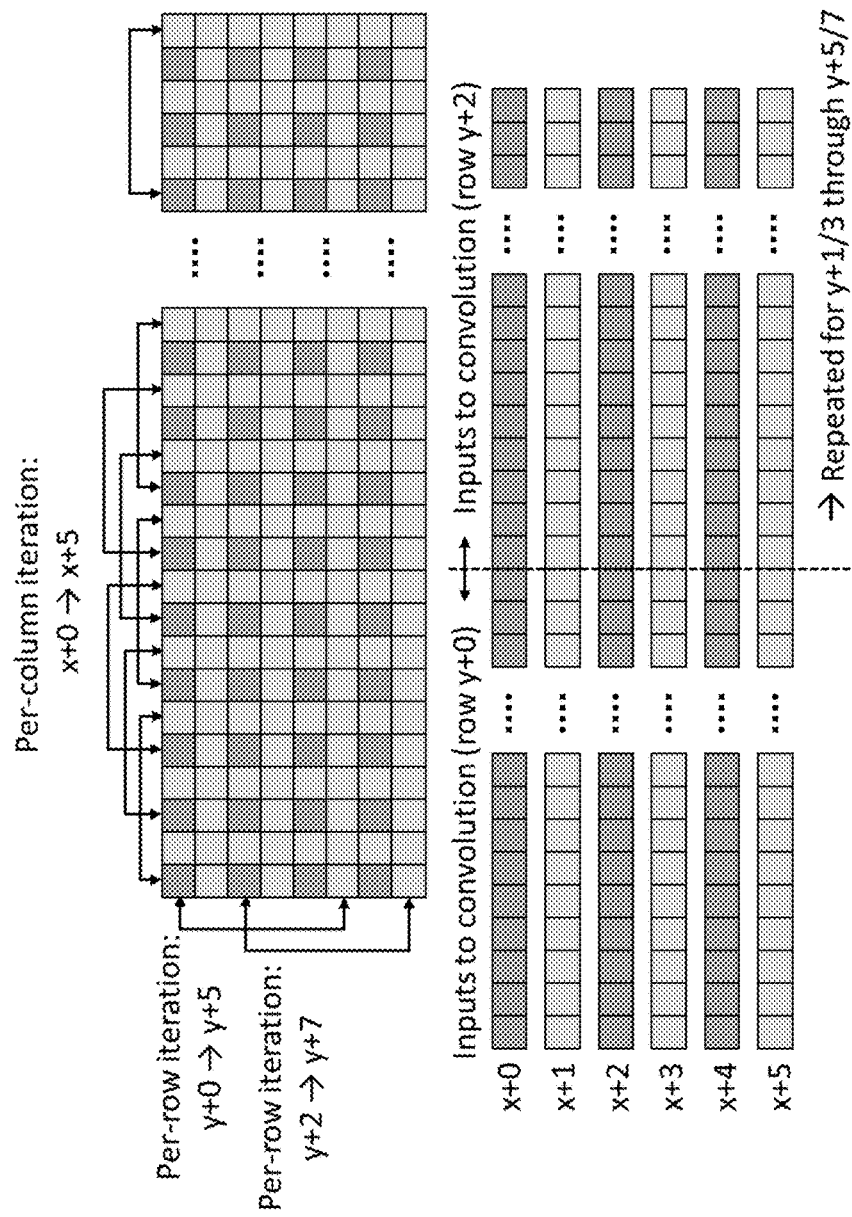
FIG. 13 is a diagram illustrating row and column inputs to an exemplary convolution operation using a data reorganization scheme.

To double the size of the subsampled vector, as illustrated in FIG. 13, a similar operation is performed on two horizontal lines, at y and y+2, with the second subsampled line concatenated at the end of the vector for the first subsampled line. The class library permits this to be accomplished in a single statement using a range mask for the assignment. This enables the horizontal convolutions to be performed on two horizontal lines at the same time (both lines use the same kernels). This approximately doubles the performance, at the cost of the setup time to do the concatenation. Since multiple kernels are convolved for a single vector reorganization, most of the potential performance benefit is realized.

As shown in FIG. 10, performing the convolution on the reorganized data in layer 1 results in two adjacent output lines appearing within a single vector at the input of layer 2. For example, row 1006 of FIG. 10 concatenates line y of layer 2 and line y+1 of layer 2. This organization is not convenient for use within layer 2, because adjacent lines should preferably appear at the same positions vertically—instead, this organization has every other line adjacent in the vertical direction. However, a better organization can be formed by shuffling the input data, after subsampling, to form input to the layer 2 convolution.

Figure 14:
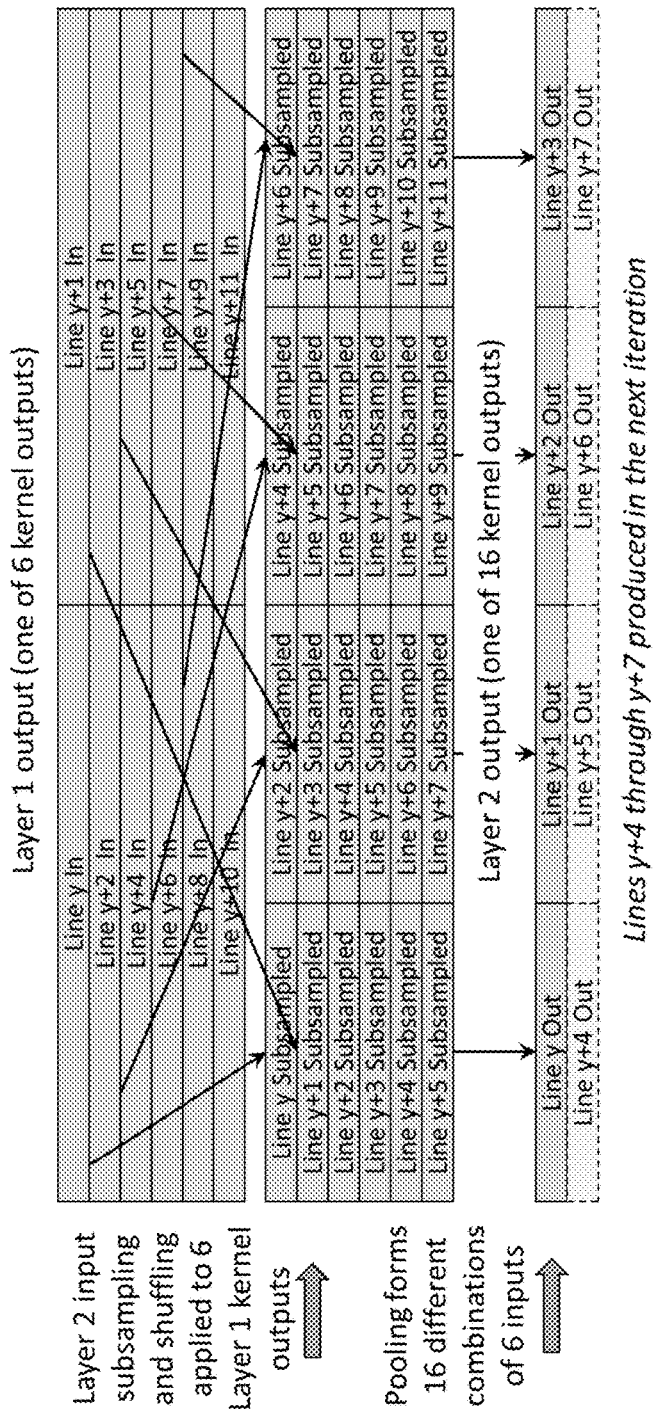
FIG. 14 is a diagram illustrating input shuffling of data as part of a data reorganization scheme.

This shuffling operation is illustrated in FIG. 14. Unlike the layer 1 reorganization at the top of FIG. 10, the shuffling of FIG. 14 is an actual movement of layer 1 signal data from one tile processor memory region to another. The idea is to get the image data for the next convolution arranged so that pixels intended to be adjacent to one another vertically are stored in the same memory region. Subsampling permits 4 horizontal convolution lines to be placed in approximately the same vector width (somewhat smaller because the convolution cannot be done at the right boundary, and a few positions don't appear in the output). To accomplish this, 4 vertical lines are subsampled and concatenated within the same vector: from the left-hand side of the vector for even lines, and from the right-hand side for odd lines. It should be understood that this operation applies to all horizontal convolutions (x+0 through x+5) and all vertical convolutions (y+0 though y+5). However, this reorganization applies to sixteen convolutions within layer 2, so again there is a net gain despite the overhead of reorganization.

Figure 15:
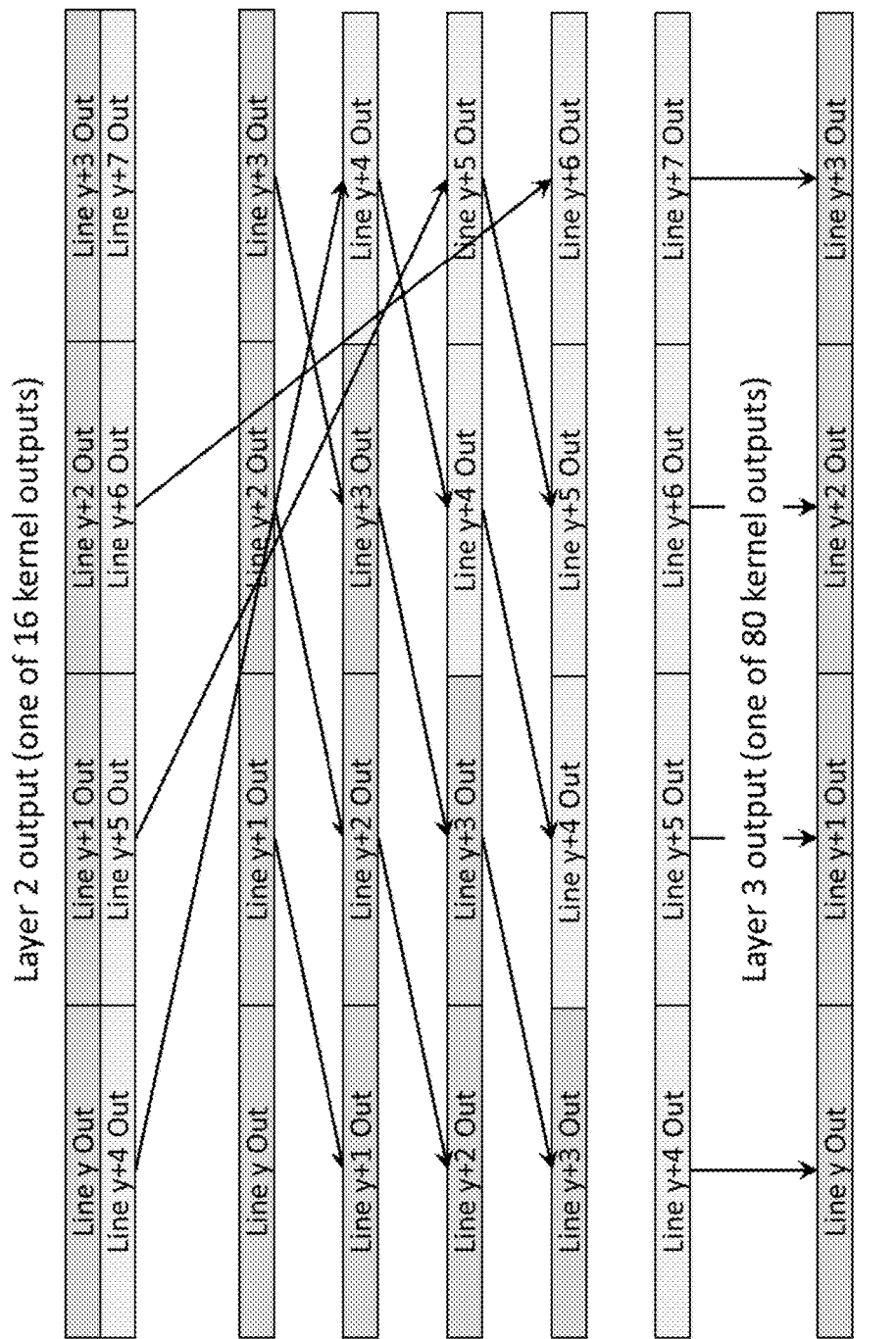
FIG. 15 is a diagram illustrating input shuffling of data as part of a data reorganization scheme.

A similar reorganization is performed in layer 3 to position the input so that is it more amenable to the convolution operation (in this case 5×5). However, layer 3 doesn't use subsampling in this neural network example, so this is a simple rotation of the input vector so that successive horizontal lines are adjacent in the vertical direction, as illustrated by FIG. 15. As with other layers, this results in output for successive lines appearing in a single vector, in 4 adjacent subvectors of the output. This organization can be used directly in layer 4 of the reference CNN code for detection and classification without requiring further reorganization.

Figure 16:
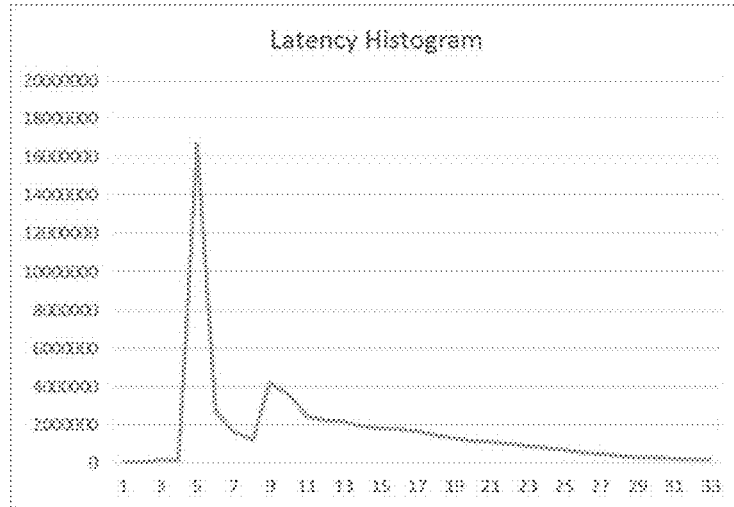
FIG. 16 is a histogram showing latency for data requests performed during operation of an exemplary CNN detection process employing data reorganization.

This embodiment of an optimized CNN implementation using the data reorganization and shuffling described above executes in 10,200,000 cycles, about 3.1 times the performance of the baseline tile processor implementation described above (32,000,000 cycles) and about 137 times the performance of the prior-art implementation mentioned above (1,400,000,000 cycles). FIG. 16 shows the latency histogram of this implementation. Data reorganization has added about 21,000,000 transfers to the baseline implementation, but the dataflow implementation of the tile array supports these transfers with very little impact to the latency profile, a key advantage to enabling the data reorganization that makes this optimization possible.

CNN Optimization—Dataflow Optimization

Figure 17:
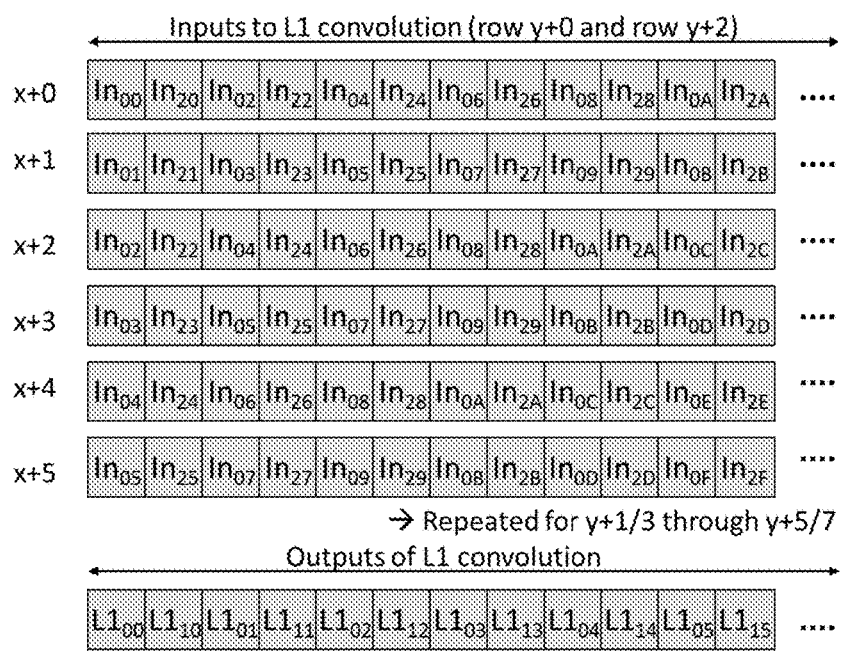
FIG. 17 is a diagram illustrating an interleaved data reorganization scheme for an exemplary convolutional neural network.

The versions of the tiled CNN implementation presented so far all require relatively large spans of data movement, either for subsampling or for concatenating vectors into larger ones. This can be avoided with another style of creating large vectors, illustrated in FIG. 17. Instead of concatenating vectors, elements of vectors from different lines are interleaved, so that elements from different lines alternate in positions of the input to the convolution. The outputs of the convolution are also in alternate positions. As in the case of the layer 1 reorganization shown in FIG. 11, this interleaving at layer 1 is accomplished by the way the tile processors fetch the data for the convolutions.

Figure 18:
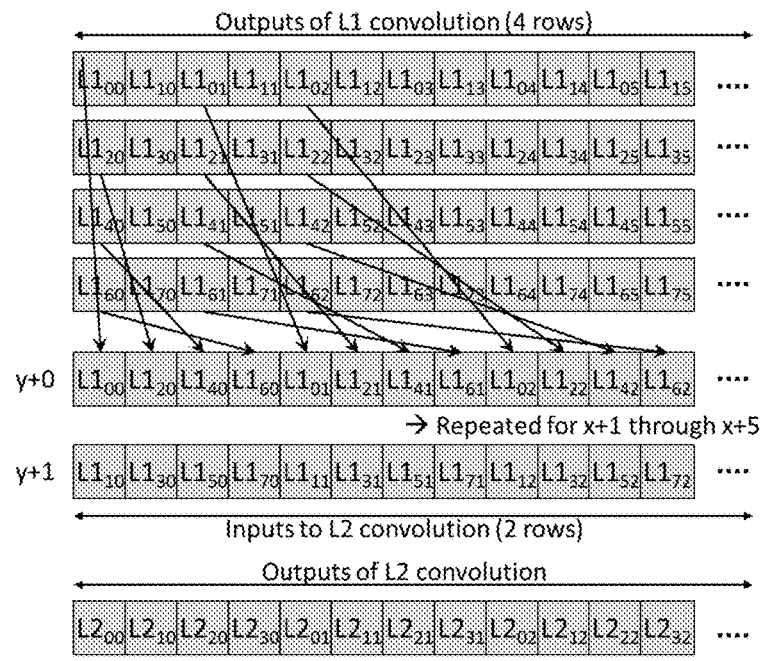
FIG. 18 is a diagram illustrating input shuffling of data as part of a data reorganization scheme.

This interleaving technique has the advantage that subsampling requires only a small movement of data elements, because these elements are moved into a nearby position instead of across roughly half the vector width. It also doesn't require a large movement of data to concatenate vectors. It does require input shuffling similar to that shown in FIG. 14 and FIG. 1, but this is simply a different form of input indexing. FIG. 18 shows this shuffling for layer 2. Other layers use a similar style—this implies that objects are detected in a different order in layer 4 compared to previous cases, but this doesn't affect correctness.

This interleaved embodiment of the tested CNN image recognition example completes in 7,170,000 cycles, about 4.5 times the baseline case, and 195 times the prior-art performance. The data-memory requirements are also smaller: the previous optimized version uses 256 registers and 205 memory locations (include 89 locations for spilled registers); the dataflow-optimized version uses 208 registers (with no spills) and 100 memory locations (for shared data only).

Figure 19:
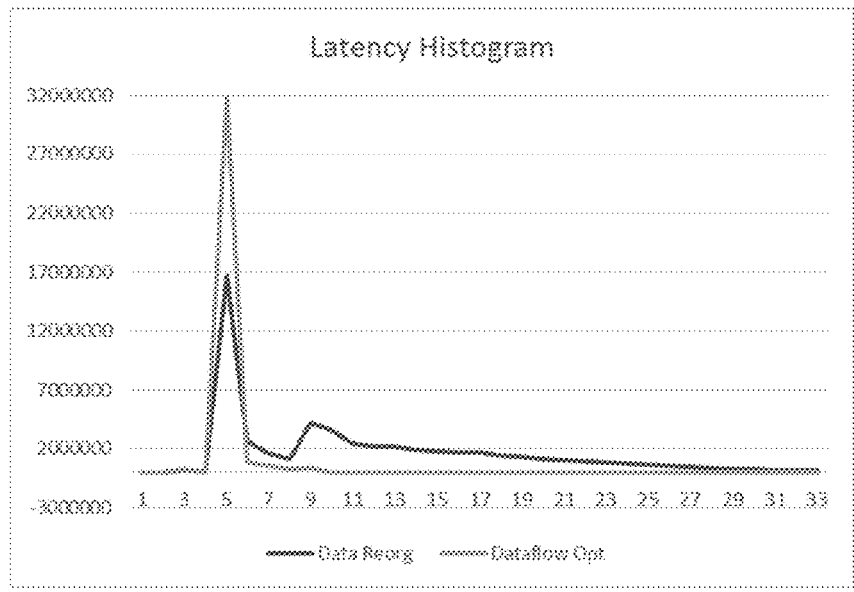
FIG. 19 is a histogram showing latency for data requests performed during operation of an exemplary CNN detection process employing an interleaved data reorganization scheme.

FIG. 19 illustrates the benefit of dataflow optimization. The distribution of latency is much tighter, with very few accesses above 7 cycles and no second peak due to accesses over larger spans of the vectors. The total number of accesses is the smallest of all shown so far. The total number of transfers is 34,300,000 compared to 55,100,000 for the previous optimized case. It is also smaller than the 37,600,000 transfers required in the baseline case, since fewer iterations are performed to process an image frame.

The description provided herein is meant to be illustrative of the principles and embodiments of the present invention. Numerous variations and modifications will become apparent to those skilled in the art once the above disclosure is fully appreciated. It is intended that any claims be interpreted to embrace all such variations and modifications.

What is claimed is:

1. A processor-implemented method for detecting a feature in a two-dimensional image, the method comprising:
   storing, in a set of data memories within a parallel processing system, first image data representing pixels of a first image, wherein
      the parallel processing system comprises a row of multiple substantially identical data processors connected by an instruction pipeline adapted for sequential conveyance of instructions from a first one of the multiple data processors to each adjacent data processor in turn,
      each of the data processors comprises a respective one of the set of data memories,
      each of the data memories is partitioned to include multiple memory regions of substantially identical storage capacity, and
      storing the first image data comprises storing data representing successive vertical slices of the first image in respective adjacent memory regions within a data memory of the parallel processing system;
   storing, in a memory of a host processor coupled to the parallel processing system, feature kernel data comprising weight data representing a set of weight matrices;
   for each of multiple selected pixels within the first image,
      performing a set of convolutions over a two-dimensional pixel region including the selected pixel, wherein each one of the set of convolutions is performed using a respective one of the set of weight matrices, and
      applying a nonlinear function to a result of each convolution to produce, for each of the weight matrices, a feature map pixel corresponding to the selected pixel;
   storing, for each of the weight matrices, a respective feature map comprising all of the feature map pixels produced using that weight matrix, wherein
      storing the respective feature map comprises storing data representing pixels of the feature map corresponding to selected pixels having separate horizontal positions in the first image in respective separate memory regions within a data memory of the parallel processing system, and
      for each pixel of a feature map, data representing the corresponding pixel produced using each of the weight matrices is stored in the same memory region; and
   processing the feature maps to produce a decision as to whether a particular feature or class of features is detected within the first image.

2. The method of claim 1, wherein
   the feature kernel data further comprises bias data representing a bias value associated with each weight matrix in the set of weight matrices; and
   each one of the set of convolutions is further performed using the bias value associated with the respective one of the set of weight matrices.

3. The method of claim 1, wherein
   performing the set of convolutions for each of the multiple selected pixels comprises sequentially executing, in adjacent data processors of the parallel processing system, instructions for performing the set of convolutions; and a single iteration of sequentially executing the instructions in adjacent data processors of the parallel processing system comprises performing the set of convolutions for all selected pixels within one horizontal row of the first image.

4. The method of claim 3, wherein the multiple selected pixels consist of pixels spaced apart, in horizontal and vertical directions within the first image, by a number of pixels defined by an integer subsampling factor n.

5. The method of claim 4, wherein
a single iteration of sequentially executing the instructions in adjacent data processors of the parallel processing system comprises performing the set of convolutions for all selected pixels within n horizontal rows of the first image; and
the n horizontal rows are adjacent rows within a series of horizontal rows spaced n pixels apart.

6. The method of claim 5, wherein storing the respective feature map further comprises, during a single iteration of sequentially executing the instructions in adjacent data processors:
storing feature map pixels corresponding to selected pixels in the uppermost of the n horizontal rows of the first image in a first group of adjacent memory regions of one or more data processors within the parallel processing system, wherein the first group of adjacent memory regions is in one or more data processors positioned closest to the beginning of the instruction pipeline of the parallel processing system;
storing feature map pixels corresponding to selected pixels in a next lower row of the n horizontal rows of the first image in a next group of adjacent memory regions adjacent to the first group of adjacent memory regions; wherein the next group of adjacent memory regions is in one or more data processors positioned further along the instruction pipeline of the parallel processing system; and
storing feature map pixels corresponding to selected pixels in any additional lower rows of then horizontal rows in successive groups of adjacent memory regions in one or more data processors positioned still further along the instruction pipeline of the parallel processing system.

7. The method of claim 5, wherein storing the respective feature map further comprises, during a single iteration of sequentially executing the instructions in adjacent data processors:
storing each feature map pixel in a first series of n feature map pixels corresponding to the first selected pixel in each of the n horizontal rows, in order from the uppermost to the lowermost of the n horizontal rows, in a respective adjacent memory region of one or more of the data processors in the parallel processing system, beginning with the first memory region of the data processor positioned closest to the beginning of the instruction pipeline of the parallel processing system;
storing each feature map pixel in a second series of n feature map pixels corresponding to the second selected pixel in each of the n horizontal rows, in order from the uppermost to the lowermost of the n horizontal rows, in a respective adjacent memory region of one or more of the data processors in the parallel processing system, beginning with the memory region immediately following the memory region storing the last feature map pixel in the first series of feature map pixels;
storing each feature map pixel in any additional series of n feature map pixels corresponding to additional selected pixels in each of the n horizontal rows, in order from the uppermost to the lowermost of the n horizontal rows, in a respective adjacent memory region of one or more of the data processors in the parallel processing system, beginning with the memory region immediately following the memory region storing the last feature map pixel in the previous series of feature map pixels.

8. The method of claim 1, wherein processing the feature maps to produce a decision comprises:
rearranging the stored data representing the feature map pixels so that data representing feature map pixels corresponding to selected pixels having the same horizontal position in the first image is all stored within the same memory region of the data processors in the parallel processing system; and
for each of multiple selected feature map pixels within each feature map, subsequently performing an additional set of convolutions over a two-dimensional feature map pixel region including the selected feature map pixel, wherein each one of the additional set of convolutions is performed using a respective one of an additional set of weight matrices stored in the memory of the host processor.

9. The method of claim 1, wherein
the first image constitutes a horizontal slice of a larger image; and
the method further comprises, subsequent to completion of the set of convolutions for first image data representing an uppermost row of the first image, overwriting the first image data representing the uppermost row of the first image with data representing a row of the larger image just below the lowest row of the larger image previously included in the first image.

10. A data processing system for detecting a feature in a two-dimensional image, the system comprising:
a row of multiple substantially identical data processors, wherein
the data processors are connected by an instruction pipeline adapted for sequential conveyance of instructions from a first one of the multiple data processors to each adjacent data processor in turn, and
each of the data processors comprises a data memory partitioned to include multiple memory regions of substantially identical storage capacity; and
a host processor coupled to the row of data processors, wherein the host processor comprises
a data memory adapted to store feature kernel data comprising weight data representing a set of weight matrices and bias data representing a bias value for each weight matrix within the set of weight matrices,
a control module adapted to fetch and provide to the instruction pipeline instructions for execution by the multiple data processors, and
stored program instructions which, when provided to the instruction pipeline and executed by the row of data processors, are operable to implement the steps of
storing, in the data memories of the multiple data processors, first image data representing a first image, wherein storing the first image data comprises storing data representing successive vertical slices of the first image in respective adjacent memory regions within a data memory of the multiple data processors, performing, for each of multiple selected pixels within the first image, a set of convolutions over a two-dimensional pixel region including the selected pixel, wherein each one of the set of convolutions is performed using a respective one of the set of weight matrices and its corresponding bias value, applying a nonlinear function to a result of each convolution to produce, for each of the weight matrices, a feature map pixel corresponding to each selected pixel, storing, for each of the weight matrices, a respective feature map comprising all of the feature map pixels produced using that weight matrix, wherein storing the respective feature map comprises storing data representing pixels of the feature map corresponding to selected pixels having separate horizontal positions in the first image in respective separate memory regions within a data memory, and for each pixel of a feature map, data representing the corresponding pixel produced using each of the weight matrices is stored in the same memory region, and processing the feature maps to produce a decision as to whether a particular feature or class of features is detected within the first image.

11. The system of claim 10, wherein the control module comprises an instruction generation unit coupled to the host processor and to the row of data processors, wherein the instruction generation unit is adapted to provide an interface between the host processor and the row of data processors; and translate custom compiler instructions received from the host processor into instructions executable by the data processors.

12. The system of claim 10, wherein performing the set of convolutions for each of the multiple selected pixels comprises sequentially executing, in adjacent data processors along the row of data processors, instructions for performing the set of convolutions; and a single iteration of sequentially executing the instructions in adjacent data processors comprises performing the set of convolutions for all selected pixels within one horizontal row of the first image.

13. The system of claim 12, wherein the multiple selected pixels consist of pixels spaced apart, in horizontal and vertical directions within the first image, by a number of pixels defined by an integer subsampling factor n.

14. The system of claim 13, wherein a single iteration of sequentially executing the instructions in adjacent data processors along the row of data processors comprises performing the set of convolutions for all selected pixels within n horizontal rows of the first image; and the n horizontal rows are adjacent rows within a series of horizontal rows spaced n pixels apart.

15. A processor implemented method for increased speed of processing operations on data in two-dimensional arrays, the method comprising:

storing, in a set of data memories within a parallel processing system, first array data representing elements of a first array, wherein the parallel processing system comprises a row of multiple substantially identical data processors connected by an instruction pipeline adapted for sequential conveyance of instructions from a first one of the multiple data processors to each adjacent data processor in turn, each of the data processors comprises a respective one of the set of data memories, each of the data memories is partitioned to include multiple memory regions of substantially identical storage capacity, and storing the first array data comprises storing data representing successive columns of the first array in respective adjacent memory regions within a data memory of the parallel processing system;

for each of multiple selected elements within the first array, performing a processing operation on the selected element to produce an output element corresponding to the selected element, wherein the multiple selected elements consist of elements spaced apart, in horizontal and vertical directions within the first array, by a number of elements defined by an integer subsampling factor n, performing the processing operation for each of the multiple selected elements comprises sequentially executing, in adjacent data processors of the parallel processing system, instructions for performing the processing operation, a single iteration of sequentially executing the instructions in adjacent data processors of the parallel processing system comprises performing the processing operation for all selected elements within n horizontal rows of the first array, and the n horizontal rows are adjacent rows within a series of horizontal rows spaced n elements apart; and storing an output array comprising all of the output elements, wherein storing the output array comprises storing data representing elements of the output array corresponding to selected elements having separate horizontal positions in the first array in respective separate memory regions within a data memory of the parallel processing system.

16. The method of claim 15, wherein performing the processing operation comprises performing one or more convolutions over a two-dimensional element region including the selected element, and each one of the one or more convolutions is performed using a coefficient matrix stored in a data memory of a host processor coupled to the parallel processing system.

17. The method of claim 15, wherein storing the output array further comprises, during a single iteration of sequentially executing the instructions in adjacent data processors:

storing output elements corresponding to selected elements in the uppermost of the n horizontal rows of the first array in a first group of adjacent memory regions of one or more data processors within the parallel processing system, wherein the first group of adjacent memory regions is in one or more data processors positioned closest to the beginning of the instruction pipeline of the parallel processing system;

storing output elements corresponding to selected elements in a next lower row of the n horizontal rows of the first array in a next group of adjacent memory regions adjacent to the first group of adjacent memory regions; wherein the next group of adjacent memory regions is in one or more data processors positioned further along the instruction pipeline of the parallel processing system; and storing output elements corresponding to selected elements in any additional lower rows of the n horizontal rows in successive groups of adjacent memory regions in one or more data processors positioned still further along the instruction pipeline of the parallel processing system.

18. The method of claim 15, wherein storing the output array further comprises, during a single iteration of sequentially executing the instructions in adjacent data processors:

storing each output element in a first series of n output elements corresponding to the first selected element in each of the n horizontal rows, in order from the uppermost to the lowermost of the n horizontal rows, in a respective adjacent memory region of one or more of the data processors in the parallel processing system, beginning with the first memory region of the data processor positioned closest to the beginning of the instruction pipeline of the parallel processing system;

storing each output element in a second series of n output elements corresponding to the second selected element in each of the n horizontal rows, in order from the uppermost to the lowermost of the n horizontal rows, in a respective adjacent memory region of one or more of the data processors in the parallel processing system, beginning with the memory region immediately following the memory region storing the last output element in the first series of output elements;

storing each output element in any additional series of n output elements corresponding to additional selected elements in each of the n horizontal rows, in order from the uppermost to the lowermost of the n horizontal rows, in a respective adjacent memory region of one or more of the data processors in the parallel processing system, beginning with the memory region immediately following the memory region storing the last output element in the previous series of output elements.

19. The method of claim 15, further comprising, subsequent to storing the output array:

rearranging the stored data representing the output elements so that data representing output elements from the same column of the output array is all stored within the same memory region of the data processors in the parallel processing system; and for each of multiple selected output elements within the output array, subsequently performing an additional processing operation on the selected output element.

20. A data processing system for increased speed of processing operations on data in two-dimensional arrays, the system comprising:

a row of multiple substantially identical data processors, wherein the data processors are connected by an instruction pipeline adapted for sequential conveyance of instructions from a first one of the multiple data processors to each adjacent data processor in turn, and each of the data processors comprises a data memory partitioned to include multiple memory regions of substantially identical storage capacity; and a host processor coupled to the row of data processors, wherein the host processor comprises a data memory adapted to store fixed data for use in processing operations on array data stored in the data memories of the row of data processors, a control module adapted to fetch and provide to the instruction pipeline instructions for execution by the multiple data processors, and stored program instructions which, when provided to the instruction pipeline and executed by the multiple data processors, are operable to implement the steps of storing, in the data memories of the multiple data processors, first array data representing elements of a first array, wherein storing the first array data comprises storing data representing successive columns of the first array in respective adjacent memory regions within a data memory of the multiple data processors, performing, for each of multiple selected elements within the first array, a processing operation on the selected element to produce an output element corresponding to the selected element, wherein the multiple selected elements consist of elements spaced apart, in horizontal and vertical directions within the first array, by a number of elements defined by an integer subsampling factor n, performing the processing operation for each of the multiple selected elements comprises sequentially executing, in adjacent data processors along the row of data processors, instructions for performing the processing operation, a single iteration of sequentially executing the instructions in adjacent data processors along the row of data processors comprises performing the processing operation for all selected elements within n horizontal rows of the first array, and the n horizontal rows are adjacent rows within a series of horizontal rows spaced n elements apart; and storing an output array comprising all of the output elements, wherein storing the output array comprises storing data representing elements of the output array corresponding to selected elements having separate horizontal positions in the first array in respective separate memory regions within a data memory of the row of data processors.

21. The system of claim 20, wherein the control module comprises an instruction generation unit coupled to the host processor and to the row of data processors, wherein the instruction generation unit is adapted to provide an interface between the host processor and the row of data processors; and translate custom compiler instructions received from the host processor into instructions executable by the data processors.

22. The system of claim 20, wherein performing the processing operation comprises performing one or more convolutions over a two-dimensional element region including the selected element, and each one of the one or more convolutions is performed using a coefficient matrix stored in the data memory of the host processor.

* * * * *